(12) United States Patent
Hammerschmidt et al.

(10) Patent No.: US 12,385,762 B2
(45) Date of Patent: Aug. 12, 2025

(54) MULTILAYERED SAFETY MECHANISM FOR A THREE-PHASE OFF-AXIS ANGLE SENSOR

(71) Applicant: Infineon Technologies AG, Neubiberg (DE)

(72) Inventors: Dirk Hammerschmidt, Finkenstein (AT); Thomas Hafner, Klagenfurt (AT); Peter Slama, Klagenfurt (AT)

(73) Assignee: Infineon Technologies AG, Neubiberg (DE)

( * ) Notice: Subject to any disclaimer, the term of this patent is extended or adjusted under 35 U.S.C. 154(b) by 589 days.

(21) Appl. No.: 16/293,485

(22) Filed: Mar. 5, 2019

(65) Prior Publication Data
US 2020/0284615 A1 Sep. 10, 2020

(51) Int. Cl.
*G01D 5/14* (2006.01)
*G01B 7/30* (2006.01)

(52) U.S. Cl.
CPC ............... *G01D 5/145* (2013.01); *G01B 7/30* (2013.01)

(58) Field of Classification Search
CPC .................................. G01D 5/145; G01B 7/30
See application file for complete search history.

(56) References Cited

U.S. PATENT DOCUMENTS

| | | | |
|---|---|---|---|
| 5,757,181 A * | 5/1998 | Wolf | F02D 41/2474 324/225 |
| 9,234,773 B2 | 1/2016 | Cramer | |
| 10,605,626 B2 | 3/2020 | Hammerschmidt | |
| 2010/0321008 A1* | 12/2010 | Mita | G01D 5/145 324/207.25 |
| 2013/0043863 A1* | 2/2013 | Ausserlechner | G01B 13/02 324/207.2 |
| 2015/0019152 A1* | 1/2015 | Scheibenzuber | G01D 5/2448 702/94 |
| 2015/0057970 A1* | 2/2015 | Feuersaenger | G01B 7/30 702/151 |
| 2015/0108971 A1* | 4/2015 | Granig | G01R 33/091 324/252 |

(Continued)

FOREIGN PATENT DOCUMENTS

| | | |
|---|---|---|
| DE | 112011101696 T5 | 4/2013 |
| DE | 102017127985 A1 | 6/2018 |
| DE | 102018113821 A1 | 12/2018 |

*Primary Examiner* — Shelby A Turner
*Assistant Examiner* — Brandon J Becker
(74) *Attorney, Agent, or Firm* — Harrity & Harrity, LLP

(57) ABSTRACT

A off-axis angle sensor may receive a set of output signals including a first output signal, a second output signal, and a third output signal. The off-axis angle sensor may determine, based on the set of output signals, a set of delta signals including a first delta signal, a second delta signal, and a third delta signal. The off-axis angle sensor may identify a set of functional safety checks, from a plurality of functional safety checks configured on the off-axis angle sensor, for selective performance in association with determining functional safety of the off-axis angle sensor. Each of the plurality of functional safety checks may be performed independently of each of the other functional safety checks. The off-axis angle sensor may perform one or more functional safety checks based at least in part on at least one of: the set of output signals or the set of delta signals.

20 Claims, 13 Drawing Sheets

(56) References Cited

U.S. PATENT DOCUMENTS

| | | | |
|---|---|---|---|
| 2015/0241523 A1* | 8/2015 | Scherr | G01R 33/0023 |
| | | | 324/244 |
| 2015/0285661 A1* | 10/2015 | Ausserlechner | G01D 5/16 |
| | | | 324/207.21 |
| 2016/0139230 A1* | 5/2016 | Petrie | G01R 35/005 |
| | | | 324/225 |
| 2016/0169707 A1* | 6/2016 | Hirota | G01R 33/09 |
| | | | 702/151 |
| 2017/0328701 A1* | 11/2017 | Ausserlechner | G01D 5/145 |
| 2017/0370747 A1* | 12/2017 | Uchida | G01D 5/16 |
| 2018/0087930 A1* | 3/2018 | Motz | G01R 31/2884 |
| 2018/0172481 A1* | 6/2018 | Mochizuki | G01D 5/16 |
| 2018/0172779 A1* | 6/2018 | Stahl-Offergeld | G01R 33/075 |
| 2019/0178681 A1* | 6/2019 | Tandjeu-Tchuissi | |
| | | | B62D 15/0215 |
| 2019/0390983 A1* | 12/2019 | Bilbao De Mendizabal | |
| | | | G01D 5/245 |

* cited by examiner

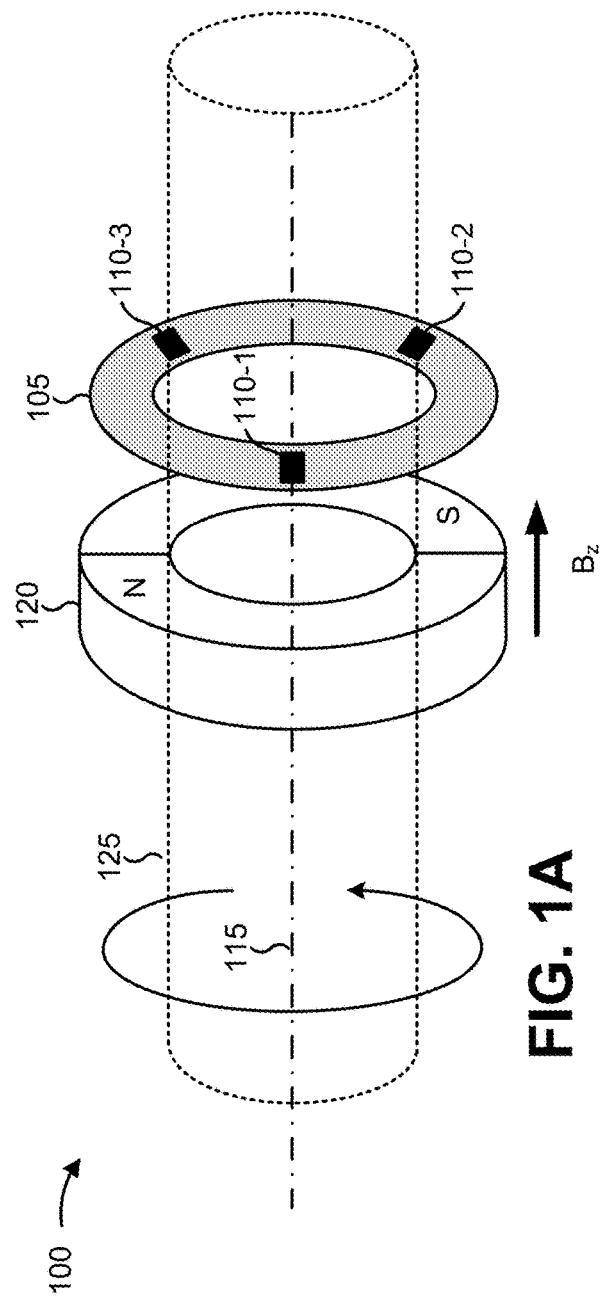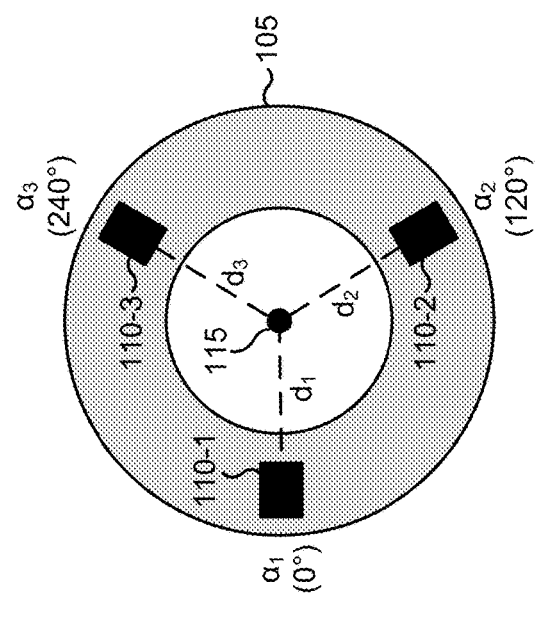

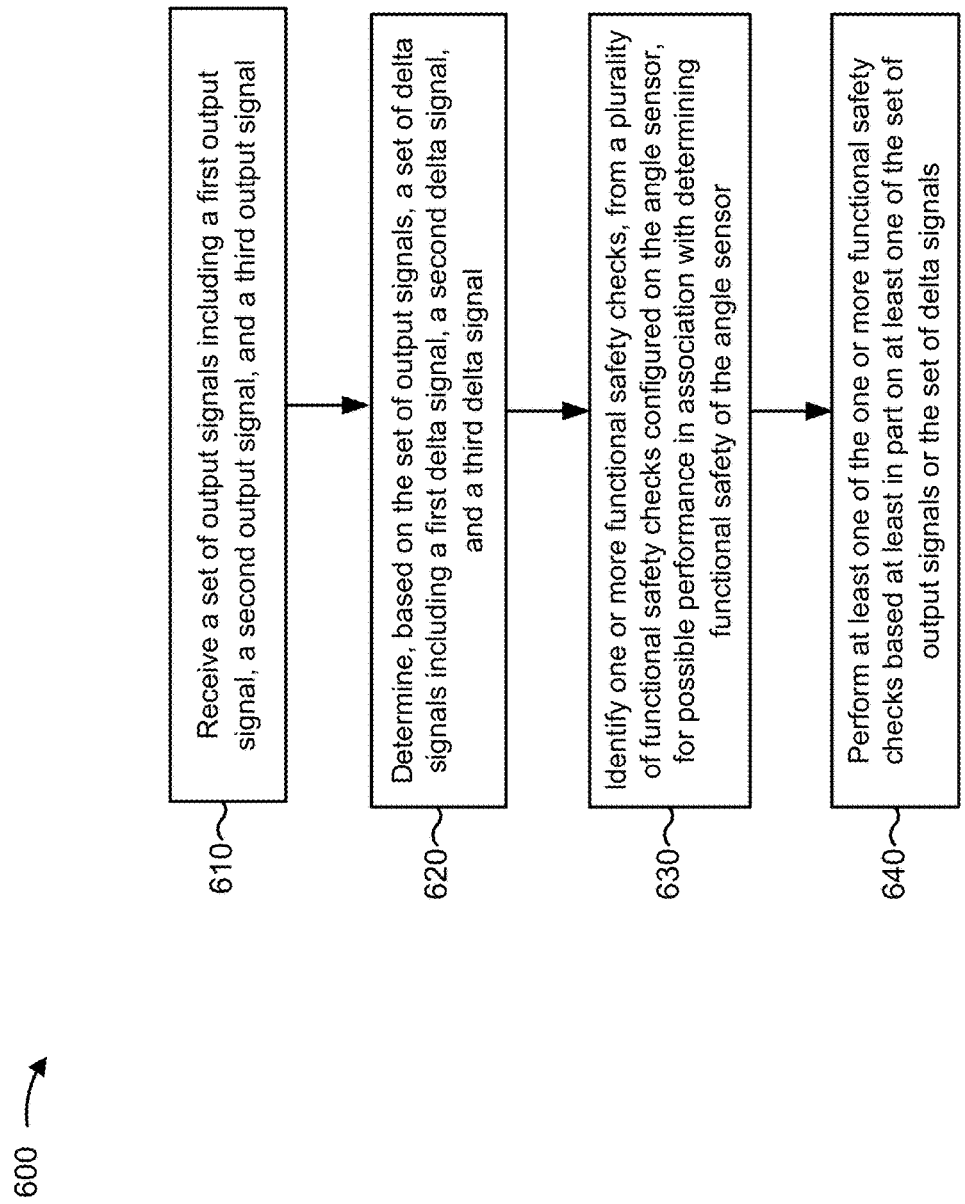

MULTILAYERED SAFETY MECHANISM FOR A THREE-PHASE OFF-AXIS ANGLE SENSOR

BACKGROUND

A magnetic angle sensor may sense a magnetic field produced or distorted by a rotating magnet wheel, such as a disc magnet, a ring magnet, a rectangular magnet, and/or the like. The magnetic angle sensor may output, based on the sensed magnetic field, a signal that identifies an angular position of the magnet wheel.

SUMMARY

According to some possible implementations, an off-axis angle sensor may include one or more processors to: receive a set of output signals including a first output signal, a second output signal, and a third output signal; determine, based on the set of output signals, a set of delta signals including a first delta signal, a second delta signal, and a third delta signal, wherein the first delta signal corresponds to a difference between the first output signal and the second output signal, the second delta signal corresponds to a difference between the second output signal and the third output signal, and the third delta signal corresponds to a difference between the first output signal and the third output signal; identify a set of functional safety checks, from a plurality of functional safety checks configured on the off-axis angle sensor, for selective performance in association with determining functional safety of the off-axis angle sensor, wherein each of the plurality of functional safety checks can be performed independently of each of the other functional safety checks of the plurality of functional safety checks; and perform one or more functional safety checks, of the set of functional safety checks, based at least in part on at least one of: the set of output signals, or the set of delta signals.

According to some possible implementations, an angle sensor may include one or more processors to: determine a set of delta signals including a first delta signal, a second delta signal, and a third delta signal, wherein the set of delta signals is determined based on a set of output signals including a first output signal, a second output signal, and a third output signal associated with a plurality of sensing elements; identify a set of functional safety checks for selective performance in association with determining functional safety of the angle sensor, wherein the set of functional safety checks includes at least one of: a reference signal comparison check, a reference coefficient comparison check, or a delta signal window check; and perform one or more functional safety checks, of the set of functional safety checks, based at least in part on at least one of: the set of output signals, or the set of delta signals.

According to some possible implementations, a method may include: receiving, by one or more processors of an angle sensor, a set of output signals including a first output signal, a second output signal, and a third output signal; determining, by the one or more processors and based on the set of output signals, a set of delta signals including a first delta signal, a second delta signal, and a third delta signal; identifying, by the one or more processors, one or more functional safety checks, from a plurality of functional safety checks configured on the angle sensor, for selective performance in association with determining functional safety of the angle sensor, wherein the at least on functional safety check includes a reference signal comparison check, a reference coefficient comparison check, or a delta signal window check, and wherein each of the plurality of functional safety checks can be performed independent of each of the other functional safety checks of the plurality of functional safety checks; and selectively performing, by the one or more processors, each of the one or more functional safety checks based at least in part on at least one of: the set of output signals, or the set of delta signals.

BRIEF DESCRIPTION OF THE DRAWINGS

FIGS. 1A and 1B are diagrams of an example three-phase off-axis angle sensor, as described herein.

FIG. 6 is a flow chart of an example process for selectively performing each of one or more functional safety checks based at least in part on a first delta signal, a second delta signal, and a third delta signal, as described herein.

DETAILED DESCRIPTION

Figure 2:
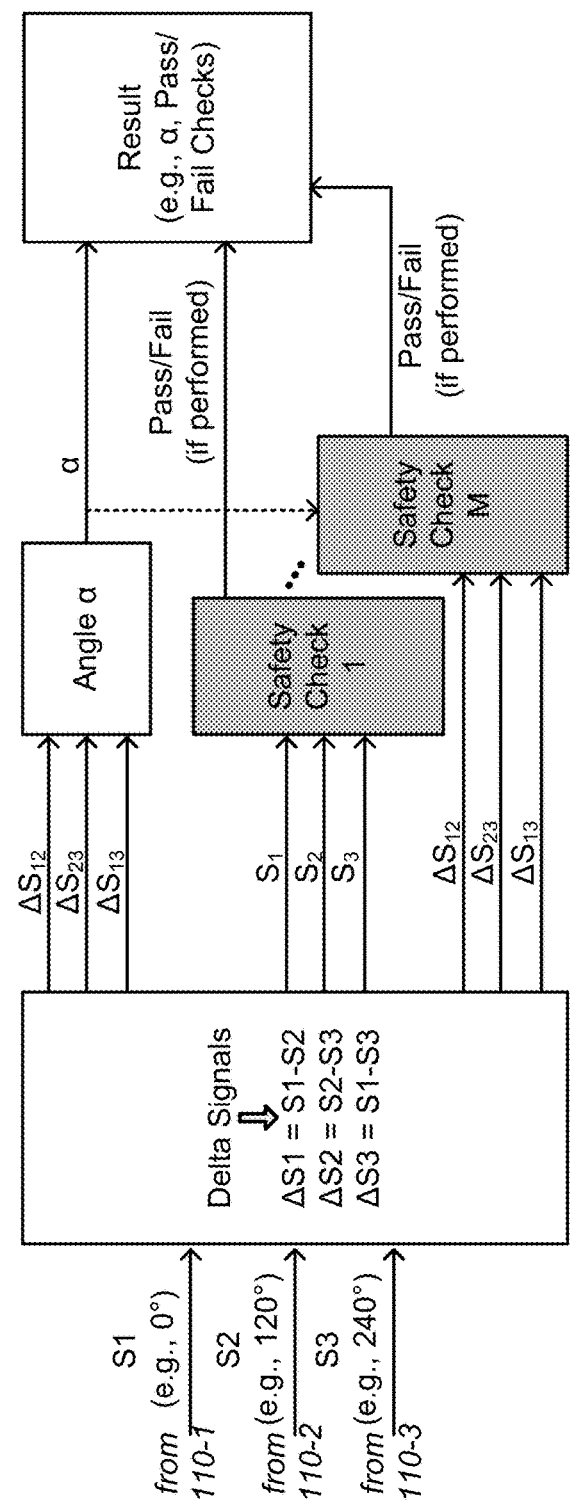
FIG. 2 is a diagram of an example implementation of multilayered safety monitoring for a three-phase off-axis angle sensor, as described herein.

The following detailed description of example implementations refers to the accompanying drawings. The same reference numbers in different drawings may identify the same or similar elements.

A magnetic angle sensor may include at least three sets of sensing elements (e.g., at least three probes), each of which is arranged in an off-axis position relative to an axis of rotation of a target magnet that produces a magnetic field. FIG. 1A is a diagram of an example sensor system 100 including a magnetic angle sensor 105 with three sets of sensing elements 110 (e.g., sensing elements 110-1, sensing elements 110-2, and sensing elements 110-3) arranged in off-axis positions relative to an axis of rotation 115 of a target magnet 120. As shown, target magnet 120 is affixed around a rotatable object 125 that can rotate about axis of rotation 115. Here, target magnet 120 rotates about axis 115 as rotatable object 125 rotates about axis 115; therefore, an angular position of target magnet 120 corresponds to an angular position of rotatable object 125. In some implementations, as illustrated in FIG. 1A, target magnet 120 may be a ring-shaped magnet such that target magnet 120 fits around rotatable object 125. As further shown in FIG. 1A, in some implementations, target magnet may be a dipole magnet, such as a harmonic dipole magnet or a wedge dipole magnet. Alternatively, target magnet 120 may be a multipole magnet comprising N (N>1) pole pairs.

FIG. 1B shows further details of an example arrangement of the sets of sensing elements 110 of angle sensor 105. As shown, each of the sets of sensing elements 110 of angle sensor 105 is positioned in an off-axis position (e.g., at a respective radial distance d from axis 115) at a different angular position relative to axis 115. For example, a set of sensing elements 110-1 is arranged at radial distance $d_1$ at an angular position $\alpha_1$ (e.g., a 0° position), a set of sensing elements 110-2 is arranged at radial distance $d_2$ at an angular position $\alpha_2$ (e.g., a 120° position), and a set of sensing elements 110-3 is arranged at radial distance $d_3$ at an angular position $\alpha_3$ (e.g., a 240° position). In the example shown in FIG. 1B, the three sets of sensing elements 110 are sensitive in a z-direction. Therefore, as target magnet 120 rotates about axis 115 and produces a rotating magnetic field B, the sets of sensing elements 110 sense respective strengths of the $B_z$ component of the magnetic field B.

In the example shown in FIGS. 1A and 1B, the sets of sensing elements 110 are spaced evenly around rotatable object 125 (e.g., at 120° with respect to one another around axis 115). This arrangement may be used in a case in which target magnet 120 is a dipole magnet, as illustrated in FIG. 1A. Here, a period of a signal provided by a given set of sensing elements 110 corresponds to a full (360°) rotation of target magnet 120. In a case where target magnet 120 is a multipole magnet comprising N pole pairs, the sets of sensing elements 110 may be spaced across a pole pair of rotatable object 125 (rather than around the entirety of rotatable object 125). In such a case, a period of a signal provided by a given set of sensing elements 110 corresponds to one pole pair. Therefore, for a target magnet 120 comprising N pole pairs, a period of a signal provided by a given set of sensing elements 110 correspond to a rotation of 360/No of target magnet 120. Notably, the techniques and apparatuses described herein can be applied to any off-axis sensor system comprising a magnetic angle sensor with at least three sets of off-axis sensing elements 110 and a target magnet 120 (e.g., a dipole magnet or a multipole magnet).

The number and arrangement of elements shown in FIGS. 1A and 1B are provided as an example, and other examples are possible. For example, while the implementations described herein are described in the context of an angle sensor 105 including three sets of sensing elements 110, the techniques and apparatuses described herein can also be applied generally to an angle sensor 105 including P (P≥3) sets of sensing elements 110. For example, the techniques and apparatuses described herein can be applied to an angle sensor including five sets of sensing elements 110 spaced around axis 115. Further, while the sets of sensing elements 110 are evenly spaced about axis 115 in this example, other arrangements are possible (e.g., in which the sets of sensing elements 110 are not evenly spaced about axis 115).

In ideal operation, as a result of such an arrangement, a set of output signals provided by the sets of sensing elements 110 includes sinusoidal signals that are phase shifted relative to one another by a particular amount. Taking the arrangement shown in FIG. 1B as an example, in an ideal case, the set of output signals includes three output signals, each of which is phase shifted from the other output signals by approximately 120°.

In practice, however, manufacturability issues and fabrication tolerances lead to non-ideal operation. For example, manufacturability issues and fabrication tolerances associated with target magnet 120 can cause target magnet 120 to deliver non-ideal sinusoidal signals for sensing by the sets of sensing elements 110. As another example, manufacturability issues and fabrication tolerances associated with the placement or positioning of the sets of sensing elements 110 can cause, for example, radial distances d from the axis of rotation 115 to vary among the sets of sensing elements 110 (e.g., $d_1=d_2=d_3$ in an ideal case). Similarly, manufacturability issues and fabrication tolerances associated with the placement or positioning of the sets of sensing elements 110 can cause distances of the sets of sensing elements 110 from target magnet 120 (e.g., in the z-direction) to differ among the sets of sensing elements 110 (e.g., due to a tilt in an assembly plane). These issues can result in deviations from ideal output signals, which reduces reliability and accuracy of angle sensor 105. Consequently, techniques for monitoring functionality of angle sensor 105 are needed (e.g., in order to ensure reliable and accurate operation of angle sensor 105).

Some implementations described herein provide techniques and apparatuses for monitoring of a three-phase angle sensor (e.g., angle sensor 105). For example, in some implementations, in order to perform monitoring of the three-phase angle sensor, the three-phase angle sensor may be configured with multiple functional safety checks. The three-phase angle sensor may selectively perform one or more of the multiple functional safety checks in association with monitoring of the functionality of the three-phase angle sensor. In some implementations, each of the multiple functional safety checks can be performed independently of each of the other functional safety checks. Notably, the techniques and apparatuses described herein allow higher order harmonics of the sinusoidal output signals to be accounted for, which is not possible using conventional monitoring techniques. Additional details and example implementations are described below.

FIG. 2 is a diagram of an example implementation 200 of multilayered safety monitoring for a three-phase off-axis angle sensor (e.g., angle sensor 105), as described herein.

As shown in FIG. 2, the sets of sensing elements 110 (e.g., sensing element 110-1, sensing element 110-2, and sensing element 110-3) provide a set of output signals (e.g., sinusoidal voltage signals including signal $S_1$, signal $S_2$, and signal $S_3$). Here, each of the set of output signals corresponds to a strength of a $B_z$ component of the magnetic field (e.g., $B_1$ through $B_3$) as sensed by a respective sensing element 110. As described above, and as indicated in FIG. 2, signals in the set of output signals may be phase shifted relative to one another (e.g., by approximately 120°).

As further shown, angle sensor 105 may determine, based on the set of output signals, a set of delta signals including a delta signal $\Delta S_{12}$, a delta signal $\Delta S_{23}$, and a delta signal $\Delta S_{13}$. Here, delta signal $\Delta S_{12}$ corresponds to a difference between the output signal $S_1$ and output signal $S_2$, delta signal $\Delta S_{23}$ corresponds to a difference between output signal $S_2$ and output signal $S_3$, and delta signal $\Delta S_{13}$ corresponds to a difference between output signal $S_1$ and output signal $S_3$. Notably, effects of any external stray fields are cancelled in the set of delta signals, meaning that use of the set of delta signals prevents external stray fields from impacting performance of angle sensor 105. In some implementations, in addition to determination of the set of delta signals, the angle sensor 105 can perform calibration of the set of output signals. Such calibration can include, for example, offset compensation, amplitude compensation, orthogonality compensation, and/or the like, which can be performed in a conventional manner. As further shown, angle sensor 105 may use the set of delta signals to compute the angle of rotation a of target magnet 120.

However, as described above, functional safety of angle sensor 105 is an important consideration since manufacturability and/or fabrication tolerance issues typically result in non-ideal performance. Thus, angle sensor 105 may be configured with a plurality of functional safety checks that angle sensor 105 can selectively perform in association with monitoring functional safety. For example, as shown in FIG. 2, angle sensor 105 may be configured with a plurality of M (M>1) safety checks. As described below, angle sensor 105 may identify a set of the M functional safety checks for selective performance, and may then perform one or more of the identified set of functional safety checks. In some implementations, one or more of the set of M functional safety checks may utilize the set of output signals (e.g., signal $S_1$, signal $S_2$, and signal $S_3$) and/or the set of delta signals (e.g., delta signal $\Delta S_{12}$, delta signal $\Delta S_{23}$, and delta signal $\Delta S_{13}$), as illustrated in FIG. 2 and as described in the examples below.

In some implementations, angle sensor 105 may identify a set of functional safety checks, of a plurality of functional safety checks configured on angle sensor 105, and may selectively perform each of the set of identified functional safety checks (e.g., such that the angle sensor 105 performs one or more of the set of identified functional safety checks). As an illustrative example, angle sensor 105 may be configured with six different functional safety checks (M=6) (i.e., angle sensor 105 may be capable of performing six different functional safety checks). In one example, angle sensor 105 identifies three of the six functional safety checks for selective performance, meaning that angle sensor 105 may selectively perform each of the three identified functional safety checks. Angle sensor 105 then performs one or more of these three identified functional safety checks in association with monitoring functionality of angle sensor 105. Details regarding example processes for identifying and selectively performing a set of functional safety checks are provided below, followed by examples of functional checks that can be configured on angle sensor 105.

In some implementations, angle sensor 105 may identify the set of functional safety checks based on a configuration of angle sensor 105. For example, angle sensor 105 may receive, from a controller (not shown), configuration information that identifies a set of functional safety checks for selective performance by angle sensor 105. In some implementations, such configuration information can be updated (e.g., such that the set of functional safety checks for selective performance can be modified based on further configuration by the controller). In some implementations, the configuration information can be determined by the controller (e.g., when the controller is configured to identify the set of functional safety checks and provide information associated with the configuration to angle sensor 105). As another example, angle sensor 105 may receive the configuration information as a result of user input to the sensor system (e.g., via the controller).

In some implementations, angle sensor 105 may identify the set of functional safety checks based on a result of a previous performance of one or more functional safety checks. For example, angle sensor 105 may perform one or more functional safety checks (in the manner described below) from a first set of identified functional safety checks, and may determine one or more respective results (e.g., including one or more values, one or more pass/fail indications, and/or the like). Here, if the set of results satisfies a condition (e.g., if a particular result satisfies a threshold or is within a particular range, if two or more results satisfy respective thresholds or are within respective ranges, if a particular combination of pass/fail results is determined, and/or the like), then angle sensor 105 may be configured to identify a second set of functional safety checks for selective performance. In other words, upon reaching a particular set of results associated with the first set of identified functional safety checks, angle sensor 105 may be configured to identify the second set of functional safety checks for a next evaluation of functional safety of angle sensor 105. In this way, the identification of the set of functional safety checks may be dynamically updated in response to results of previously performed functional safety checks.

As another example, angle sensor 105 may perform one or more functional safety checks (in the manner described below) from a first set of identified functional safety checks. Here, after performance of the one or more functional safety checks from the first set of functional safety checks, angle sensor 105 may be configured to identify a second set of functional safety checks for selective performance. In other words, after a performance of one or more functional safety checks from the first set of functional safety checks, angle sensor 105 may be configured to identify the second set of functional safety checks for a next evaluation of functional safety of angle sensor 105. In this way, the identification of the set of functional safety checks may automatically vary among iterations of functional safety monitoring, which increases diversity of functional safety monitoring in angle sensor 105.

After identifying the set of functional safety checks, angle sensor 105 may selectively perform each of the functional safety checks included in the identified set of functional safety checks.

In some implementations, angle sensor 105 may selectively perform a given functional safety check, included in the identified set, based on a result of another functional safety check included in the identified set. For example, the set of functional safety checks may include a first functional safety check and a second functional safety check. Here, angle sensor 105 may perform the first functional safety check (e.g., based at least in part on the first delta signal, the second delta signal, the third delta signal, a determined angle of rotation, and/or the like). In this example, angle sensor 105 may determine whether angle sensor 105 has passed the first functional safety check, and may selectively perform the second functional safety check based on whether angle sensor 105 has passed the first functional safety check. For example, if angle sensor 105 passes the first functional safety check, then angle sensor 105 may be configured to perform the second functional safety check. Conversely, if angle sensor 105 fails the first functional safety check, then angle sensor 105 may not perform the second functional safety check and instead may provide (e.g., to a controller) an indication that angle sensor 105 has failed the first functional safety check. As another example, if angle sensor 105 fails the first functional safety check, then angle sensor 105 may be configured to perform the second functional safety check. This can be useful when the first functional safety check indicates an error and a second (relatively slower, but more accurate) functional safety check then detects that there was in fact no error. In such a case, case a warning issued as a result of the first functional safety check could be canceled by the second functional safety check. In some cases, the second functional safety check could initiate an update associated with the first functional safety check (e.g., updating a parameter associated with the first functional safety) in to avoid future false error detection by the first functional safety check.

Such layered functional safety monitoring can be implemented when, for example, the first functional safety check can be performed in less time and/or using less resources than the second functional safety check, but a result indicating that angle sensor 105 has passed or failed the first functional safety check is not sufficiently reliable. Selective performance of additional functional safety checks can be implemented in a similar manner (e.g., based on a result of the first functional safety check and/or a result of the second functional safety check).

In some implementations, relative amounts of time, amounts of resources, and reliability of functional safety checks in the set of functional safety checks may increase for each layer of functional safety monitoring. For example, the set of functional safety checks may include a first functional safety check, a second functional safety check, and a third functional safety check. Here, a performance of the first functional safety check may require a comparatively shorter amount of time and/or comparatively fewer resources than a performance of the second functional safety check, but a result indicating that angle sensor 105 has passed the first functional safety check may be less reliable than a result indicating that angle sensor 105 has passed the second functional safety check. Similarly, a performance of the second functional safety check may require a comparatively shorter amount of time and/or comparatively fewer resources than a performance of the third functional safety check, but a result indicating that angle sensor 105 has passed the second functional safety check may be less reliable than a result indicating that angle sensor 105 has passed the third functional safety check. Consequently, the first, second, and third functional safety checks can be selectively performed until a desired passing result reliability is achieved (or until a failing result is reached). In this way, trade-off between speed/resource consumption and reliability can be managed through use of layered functional safety monitoring.

In some implementations, angle sensor 105 may be configured to perform each of the functional safety checks included in the set of functional safety checks (e.g., such that angle sensor 105 performs each functional safety check, included in the set, regardless of results of other functional safety checks).

Notably, in angle sensor 105, each of the functional safety checks configured on angle sensor 105 can be performed independently of each of the other functional safety checks configured on angle sensor 105. In other words, angle sensor 105 may be capable of performing any functional safety check, without requiring information from another functional safety check.

As further indicated in FIG. 2, results of performing the one or more functional safety checks of the set of identified functional safety checks, as well as information that identifies an angle of rotation of target magnet 120 (i.e., an angle of rotation of rotatable object 120), can be provided for output by angle sensor 105 (e.g., to a controller). In some implementations, the output from angle sensor 105 may include information indicating whether angle sensor 105 has passed the performed one or more functional safety checks.

The number and arrangement of elements shown in FIG. 2 are provided as an example. In practice, there may be additional elements, fewer elements, different elements, or differently arranged elements than those shown in FIG. 2. Furthermore, two or more elements shown in FIG. 2 may be implemented within a single element, or a single element shown in FIG. 2 may be implemented as multiple, distributed elements. Additionally, or alternatively, a set of elements (e.g., one or more elements) shown in FIG. 2 may perform one or more functions described as being performed by another set of elements.

In some implementations, angle sensor 105 may be configured with a functional safety check in the form of a sum check. In some implementations, in order to perform the sum check, angle sensor 105 may calculate a sum of signal $S_1$, signal $S_2$, and signal $S_3$, and may determine whether the sum is between an upper limit and a lower limit (e.g., within a particular range of values, such as a range between approximately −0.3 and approximately 0.6). Here, if the sum is between the upper limit and the lower limit, then angle sensor 105 may determine that angle sensor 105 has passed the sum check. Conversely, if the sum is not between the upper limit and the lower limit, then angle sensor 105 may determine that angle sensor 105 has failed the sum check. The sum check requires comparatively less time and resources than some other functional safety checks (e.g., since the sum check relies on simple calculations and a comparison with a fixed threshold), but a passing result is less selective than some other functional safety checks. Thus, in some cases, the sum check can be implemented as a lower layer functional safety check (e.g., such that the sum check is the first functional safety check performed when the sum check is included in a set of functional safety checks identified for selective performance). The sum check (and other checks that can be performed relatively quickly but with less selectivity) may be useful, even though such functional safety checks may only detect a massive fault, since a massive fault is the most dangerous type of fault that should be detected as quickly as possible. Thus, the sum check may allow severe harm to be prevented in a reduced amount of time (as compared to comparatively more complex functional safety checks). However, the sum check may allow a less severe fault to pass and, thus, may be used in conjunction with one or more other comparatively slower functional safety checks that provide increased selectivity.

In some implementations, angle sensor 105 may be configured with a functional safety check in the form of a sum of squares check. In some implementations, in order to perform the sum of squares check, angle sensor 105 may calculate a sum of a square of delta signal $\Delta S_{12}$, a square of delta signal $\Delta S_{23}$, and a square of delta signal $\Delta S_{13}$. Next, angle sensor 105 may determine whether the sum of the squares between an upper limit and a lower limit. Here, if the sum of the squares between the upper limit and the lower limit, then angle sensor 105 may determine that angle sensor 105 has passed the sum of squares check. Conversely, if the sum of the squares is not between the upper limit and the lower limit, then angle sensor 105 may determine that angle sensor 105 has failed the sum of squares check. Similar to the sum check, the sum of squares check requires comparatively less time and resources than some other functional safety checks, but a passing result is less reliable than some other functional safety checks. Thus, in some cases, the sum of squares check can be implemented as a lower layer functional safety check (e.g., such that the sum of squares check is the first functional safety check performed when the sum of squares check is included in a set of functional safety checks identified for selective performance).

In some implementations, angle sensor 105 sensor may be configured with a functional safety check in the form of a reference signal comparison check. Since deviations of the delta signals are a combination of harmonics of a base sinusoidal signal, a reference signal can be calculated, where the reference signal depends on an angular measurement and a set of reference Fourier coefficients. In some implementations, the set of reference Fourier coefficients is a set of Fourier coefficients that is stored on angle sensor 105 during an initial end of line calibration performed after the sensor system is assembled. Additionally, or alternatively, the set of reference Fourier coefficients may be a set of Fourier coefficients derived from a fast Fourier transform (FFT) performed in association with another (higher level) functional safety check.

In some implementations, in order to perform the reference signal comparison check, angle sensor 105 may determine an angular measurement (e.g., as calculated based on delta signal $\Delta S_{12}$, delta signal $\Delta S_{23}$, and delta signal $\Delta S_{13}$). Angle sensor 105 may also identify the set of reference Fourier coefficients associated with angle sensor 105, and may compute a reference signal based on the angular measurement and the set of reference Fourier coefficients. Here, angle sensor 105 may determine whether an actual signal as determined by angle sensor 105 is between an upper limit and a lower limit with respect to the reference signal. Here, if the actual signal is between the upper limit and the lower limit with respect to the reference signal, then angle sensor 105 may determine that angle sensor 105 has passed the reference signal check. Conversely, if the actual signal is not between the upper limit and the lower limit with respect to the reference signal, then angle sensor 105 may determine that angle sensor 105 has failed the reference signal check.

The reference signal check requires comparatively more time and resources than the sum check and the sum of squares check (e.g., since the reference signal check uses the angular measurement that must be first calculated by angle sensor 105, and since further trigonometric calculations are needed), and a passing result is comparatively more reliable than that of the sum check and the sum of squares check. However, the reference signal check requires comparatively less time and resources than some other functional safety checks, but a passing result is less reliable than some other functional safety checks. Thus, in some cases, the reference signal check can be implemented as a middle or upper layer functional safety check (e.g., such that the reference signal check is to be performed after the sum check and before one or more other checks).

In some implementations, angle sensor 105 sensor may be configured with a functional safety check in the form of a reference coefficient comparison check. In some implementations, when performing the reference coefficient comparison check, angle sensor 105 may generate a test signal based on signal $S_1$, signal $S_2$, and signal $S_3$. The test signal may include, for example, a signal generated by summing signal $S_1$, signal $S_2$, and signal $S_3$, or a signal generated by summing a square of delta signal $\Delta S_{12}$, a square of delta signal $\Delta S_{23}$, and a square of delta signal $\Delta S_{13}$. In some implementations, criteria for the reference coefficient comparison can be set independently for each FFT spectral point. In particular, the coefficient for the DC coefficient may be comparatively more restrictive when using a signal generated by summing the squares of the delta signals as compared to a signal generated by summing the output signals (e.g., since the signal generated by summing the output signals includes any kind of sensor offsets as well as stray field influence). The base frequency of the angle measurement (first non-DC FFT coefficient) and higher harmonics must not necessarily be less restrictive, the tolerance depends on the influence of the stray field and its spectral bandwidth with respect to the time in which the samples for the FFT were captured.

Angle sensor 105 may sample the test signal during a full rotation of target magnet 120, and may calculate a set of actual Fourier coefficients based on sampling the test signal. Next, angle sensor 105 may compare the set of actual Fourier coefficients and the set of reference Fourier coefficients in order to determine whether a given actual Fourier coefficient is between an upper limit and a lower limit with respect to a corresponding reference Fourier coefficient or is below a threshold value. The set of reference Fourier coefficients is a set of reference Fourier coefficients stored on angle sensor 105 during end of line calibration or derived from FFT performed in association with another functional safety check, as described above. Here, if each of the set of actual Fourier coefficients satisfies an applicable condition (e.g., being between the upper limit and the lower limit with respect to a reference Fourier coefficient, or being below a threshold value), then angle sensor 105 may determine that angle sensor 105 has passed the reference coefficient comparison check. Conversely, if each of the set of actual Fourier coefficients does not satisfy the applicable condition, then angle sensor 105 may determine that angle sensor 105 has failed the reference coefficient comparison check. In some implementations, the upper limit, the lower limit, and/or the threshold value can differ among the Fourier coefficients. For example, some coefficients may need to be within a tolerance window around a reference value (e.g., the DC of the sum of squares or a coefficient for harmonic deviations from an ideal sinusoidal magnetic field), while other others may only be required to stay below a threshold. In some implementations, when angle sensor 105 determines that angle sensor 105 has passed the reference coefficient comparison check, angle sensor 105 may update the set of reference Fourier coefficients based on the set of actual Fourier coefficients (e.g., such that the set of actual Fourier coefficients becomes the set of reference coefficients for a subsequent functional safety check, such as a subsequent performance of a reference signal check).

In some implementations, angle sensor 105 may generate a lookup based on the test signal (e.g., after angle sensor 105 determines that angle sensor 105 has passed the reference coefficient comparison check). In such a case, the lookup table may be used in association with performing the reference signal comparison check (e.g., with less calculation than required as compared to the manner described above).

The reference coefficient comparison check requires comparatively more time and resources than the above described functional safety checks (e.g., since the reference coefficient comparison check requires a full rotation of target magnet 120 and fast Fourier transform (FFT) calculation), and a passing result is comparatively more reliable than that of the above described functional safety checks. Thus, in some cases, the reference signal check can be implemented as an upper layer functional safety check (e.g., such that the reference coefficient comparison check is the last functional safety check that is to be performed by angle sensor 105).

Figure 3A:
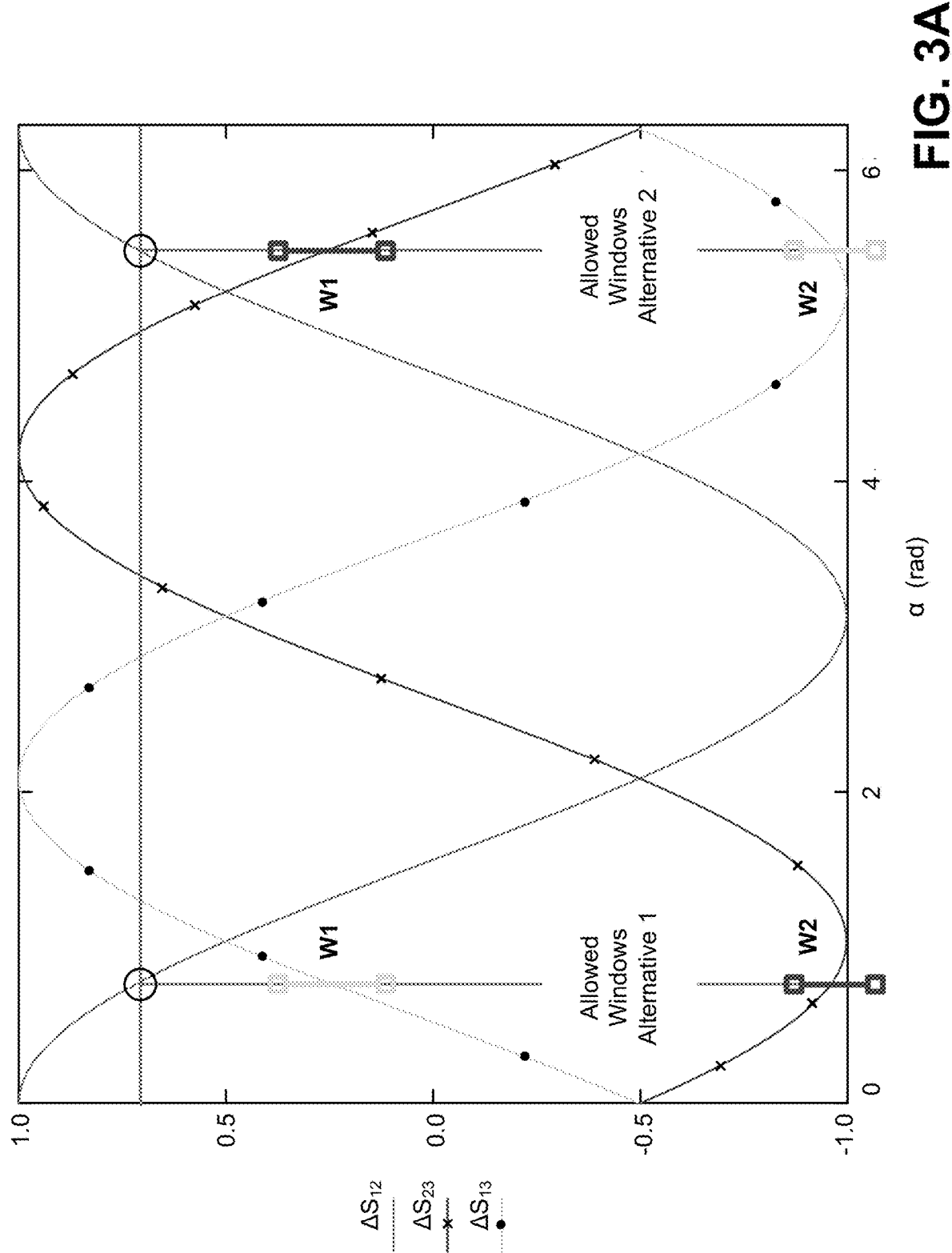
FIGS. 3A and 3B are diagrams associated with an example implementation of a functional safety check configured on the three-phase angle sensor, as described herein.
Figure 3B:
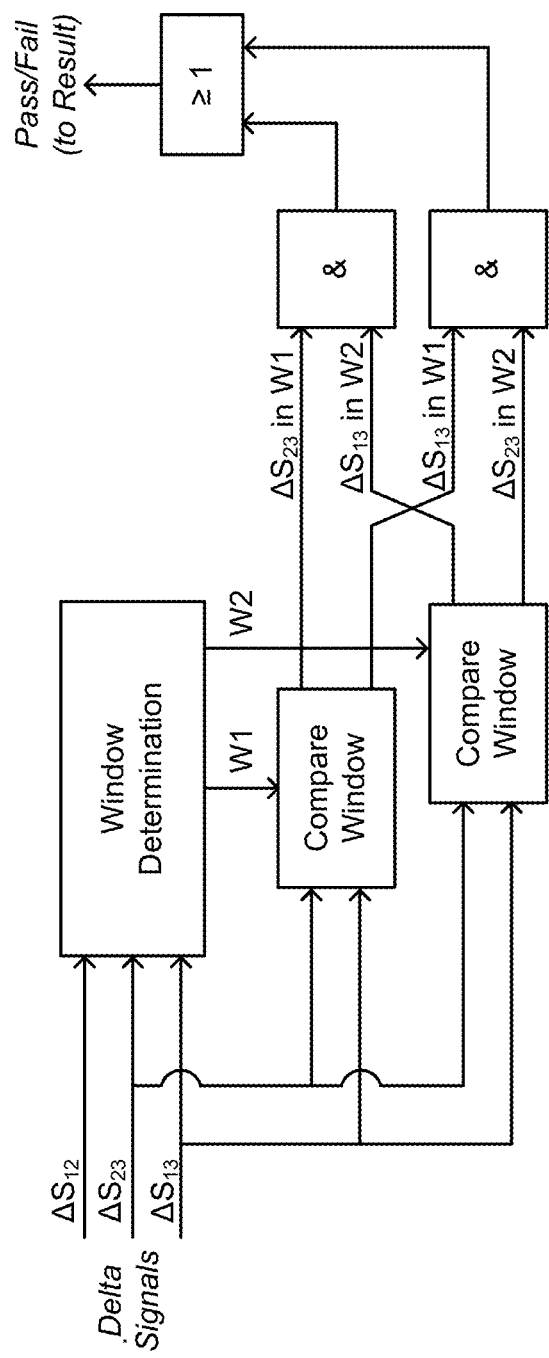

In some implementations, angle sensor 105 sensor may be configured with a functional safety check in the form of a signal window check. FIGS. 3A and 3B are diagrams associated with an example implementation of a signal window check.

In some implementations, in association with performing the signal window check, angle sensor 105 may determine a signal window W1 and a signal window W2 based on one of the delta signals. A signal window identifies a range of allowable values for other delta signals of the set of delta signals (i.e., delta signals other than that used to determine the signal windows).

FIG. 3A is a diagram illustrating example signal windows determined based on delta signal $\Delta S_{12}$. As shown in FIG. 3A, delta signal windows W1 and W2 identify two pairs of ranges of possible values for delta signals $\Delta S_{23}$ and $\Delta S_{13}$. For example, a particular value of delta signal $\Delta S_{12}$ occurs at two different angular positions of target magnet 120 (e.g., as indicated by the circled points in FIG. 3A). Here, at the first instance of the particular value of delta signal $\Delta S_{12}$, an allowable range for delta signal $\Delta S_{13}$ corresponds to values within signal window W1, and an allowable range for delta signal $\Delta S_{23}$ corresponds to values within signal window W2. At the second instance of the particular value of delta signal $\Delta S_{12}$, an allowable range for delta signal $\Delta S_{23}$ corresponds to values within signal window W1, and an allowable range for delta signal $\Delta S_{13}$ corresponds to values within signal window W2. As indicated in FIG. 3A, a given signal window includes a range of values near (e.g., within a threshold) an ideal or expected signal value. Notably, while FIG. 3A illustrates sinusoidal signals, similar techniques can be applied to any periodic set of waveforms which are phase shifted with a known angle offset.

In some implementations, angle sensor 105 may determine the signal windows based on information stored by angle sensor 105. For example, angle sensor 105 may be configured with a lookup table that, for a given value of delta signal $\Delta S_{12}$, identifies signal windows (e.g., allowable ranges of values) for delta signal $\Delta S_{23}$ and delta signal $\Delta S_{13}$. In some implementations, the lookup table can be populated during calibration of angle sensor 105. In some implementations, use of the lookup table reduces or prevents delay during performance of the signal window check (e.g., since signal windows can be determined with a single read operation).

Alternatively, angle sensor 105 may determine the signal windows using a formula configured on angle sensor 105, such as a formula that uses a Fourier row (with a limited number of coefficients) and defined offsets for upper and lower limits, which are added and subtracted to the delta signal based on which signal windows are to be determined. Such an implementation may be advantageous when chip area needs to be minimized (e.g., since chip area used for a lookup table would be eliminated) and/or when an amount of latency is not critical (e.g., due to a long fault tolerant time for the application).

In some implementations, as a next step associated with performing the signal window check, angle sensor 105 may determine whether the other delta signals (e.g., the delta signals other than that based on which the signal windows were determined) fall within the signal windows. For example, if angle sensor 105 determines the signal windows W1 and W2 illustrated in FIG. 3A based on delta signal $\Delta S_{12}$, then angle sensor 105 may determine (1) whether a value of delta signal $\Delta S_{13}$ is within signal window W1 and a value of delta signal $\Delta S_{23}$ is within signal window W2, and (2) whether a value of delta signal $\Delta S_{23}$ is within signal window W1 and a value of delta signal $\Delta S_{13}$ is within signal window W2. If either (1) or (2) is true, then angle sensor 105 may determine that angle sensor 105 has passed the signal window check (i.e., that the values of the other delta signals are within allowable ranges). Conversely, if neither (1) or (2) is true, then angle sensor 105 may determine that angle sensor 105 has failed the signal window check. FIG. 3B is a schematic representation of the above-described process for performing the signal window check.

The signal window check may require comparatively less time and resources than some other functional safety checks (e.g., since the signal window check may rely on simple calculations and a comparison with stored signal windows), but a passing result may be less reliable than some other functional safety checks. Thus, in some cases, the signal window check can be implemented as a lower or middle layer functional safety check.

As indicated above, FIGS. 3A and 3B are provided as illustrative examples, and other examples are possible from those described in FIGS. 3A and 3B.

Due to the above described non-ideality, calibration of angle sensor 105 should be performed after assembly (e.g., on an application level), meaning that an option to initiate calibration is needed. In some implementations, calibration initiation can be performed using an externally initiated bus communication (e.g., initiated via CAN, FlexRay, Ethernet, and/or the like) by a controller associated with angle sensor 105. In some implementations, during calibration, a rotation of target magnet 120 is initiated under controlled operational and/or environmental conditions. During this rotation, the delta signals are monitored by angle sensor 105 for use in a given functional safety check. For example, for the signal window check, a window determination component of angle sensor 105 may monitor the delta signals, and may use a relation of the delta signals with respect to one another in order to generate the signal windows (e.g., including tolerances associated with a given application, such as a temperature range, aging, and/or the like).

In some implementations, if temperature information is available (e.g., from a temperature sensor included in angle sensor 105, near angle sensor 105, external to angle sensor 105, and/or the like), angle sensor 105 may perform one or more functional safety checks based on the temperature information. For example, angle sensor 105 may determine a temperature at or near angle sensor 105 and, based on this information, may apply a temperature coefficient to a given signal (e.g., in order to account for operation at the identified temperature). In this way, accuracy and/or reliability of a given functional safety check can be improved when temperature information is available to angle sensor 105.

Figure 4:
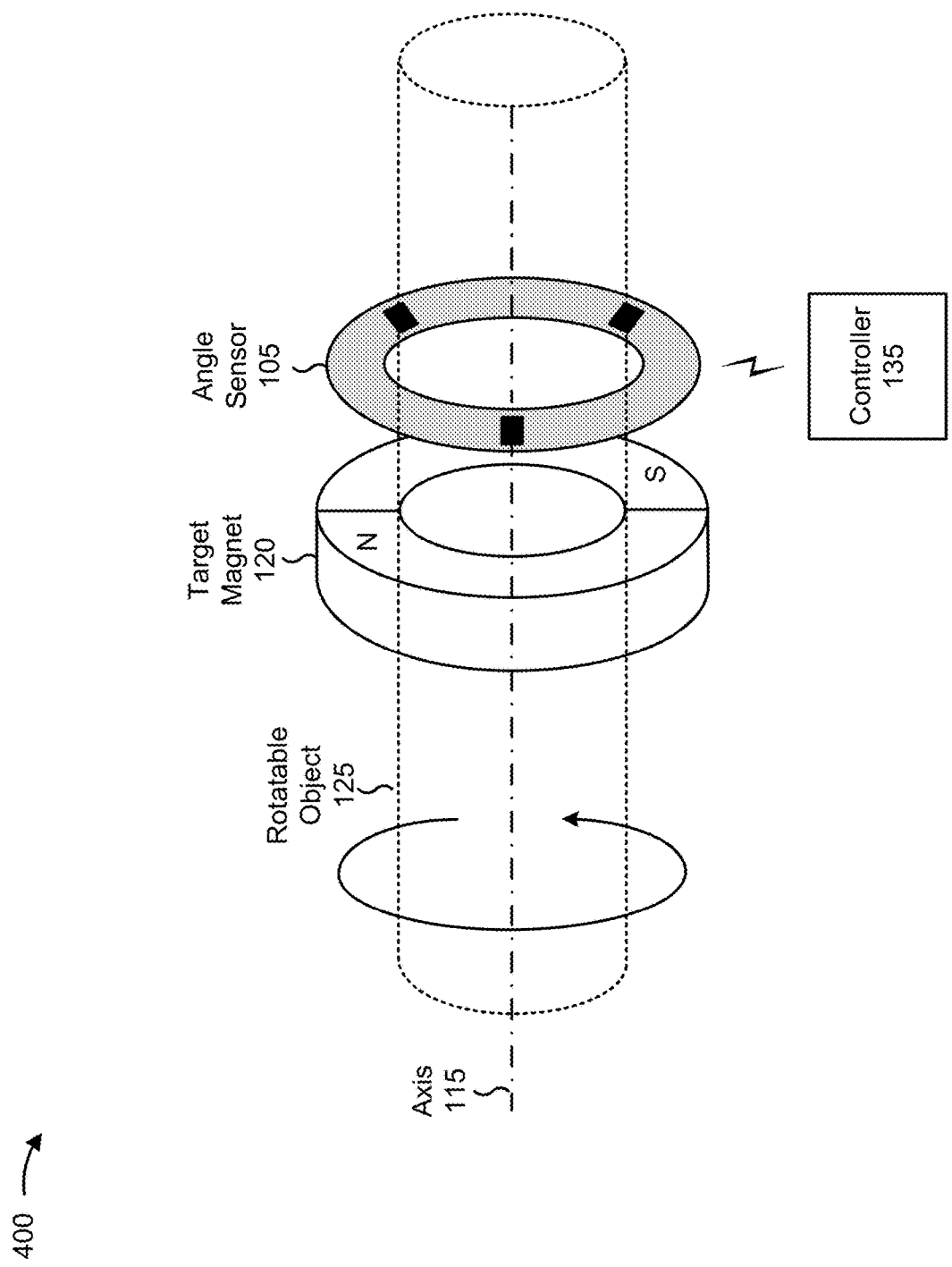
FIG. 4 is a diagram illustrating an example environment in which techniques and/or methods described herein may be implemented.

As a particular example, in the case of the signal window check, temperature coefficients can be assigned to signal window tolerances in order to account for operational temperature. This increases diagnostic coverage of the signal window check by reducing uncertainty of a determination of whether a given delta signal falls within a signal window. In some implementations, the temperature coefficients can be configured as default values that are characterized for a given application setup. In a case in which it is possible to measure each system at different temperatures during the calibration, an individual adjustment of the temperature coefficients may be possible (e.g., in order to further increase accuracy of diagnostic coverage FIG. 4 is a diagram illustrating an example environment 400 in which techniques and/or methods described herein may be implemented. As shown in FIG. 4, environment 400 may include target magnet 120 arranged to rotate about axis 115, angle sensor 105 (e.g., a three-phase angle sensor), and controller 135.

Target magnet 120 includes one or more magnets positioned in an off-axis position in order to rotate about axis 115. In some implementations, target magnet 120 may be connected (e.g., mechanically) to a rotatable object 125 such that a rotation angle α of target magnet 120 corresponds to a rotation angle of rotatable object 125 (e.g., when there exists a non-slip relation between an end face of rotatable object 125 and target magnet 120).

In the example environment 400 shown in FIG. 4, target magnet 120 may be a ring magnet that comprises a first half forming a north pole (N) and a second half forming a south pole (S), so that target magnet 120 comprises one pole pair. In some implementations, target magnet 120 may, without limitation, comprise more than one pole pair (i.e., target magnet 120 can be a multipole magnet, as described above).

While target magnet 120 is shown as having a circular ring shape in FIG. 4, target magnet 120 may be another type of ring shape, such as a square, a rectangular, an ellipse, or the like. For example, target magnet 120 may be of an elliptical shape in an instance where an angle between a plane corresponding to a surface of target magnet 120 and axis 115 deviates from a substantially perpendicular relation. The plane may include a plane symmetrically cutting through target magnet 120 and including a magnet center of target magnet 120. In most practical cases, the plane may be substantially perpendicular to axis 115.

In some implementations, target magnet 120 may include a dipole magnet (e.g., a harmonic dipole magnet, a wedge dipole magnet, and/or the like) or a multipole magnet comprising N pole pairs. Target magnet 120 may comprise a ferromagnetic material (e.g., Hard Ferrite), and may produce a magnetic field. Target magnet 120 may comprise a rare earth magnet which may be of advantage due to an intrinsically high magnetic field strength of rare earth magnets. As described above, in some implementations, target magnet 120 may be attached around rotatable object 125 for which a rotation angle may be determined (e.g., by angle sensor 105) based on a rotation angle of target magnet 120.

Angle sensor 105 includes an off-axis angle sensor device capable of detecting N (N>3) components of a magnetic field for use in determining an angle of rotation (e.g., of target magnet 120 and/or of rotatable object 125). In some implementations, angle sensor 105 may include sets of sensing elements associated with providing angle sensing functionality. For example, in some implementations, angle sensor 105 may include three sets of sensing elements (e.g., included in one or more integrated circuits) configured to sense a $B_z$ component of the magnetic field produced by target magnet 120.

As shown in FIG. 4, in some implementations, angle sensor 105 may be placed at a position relative to target magnet 120 such that angle sensor 105 can detect the $B_z$ components of the magnetic field produced by target magnet 120.

In some implementations, angle sensor 105 may be capable of selectively performing one or more functional safety checks configured on angle sensor 105, as described herein. Additional details regarding angle sensor 105 are described below with regard to FIG. 5.

Controller 135 includes a device (e.g., an electronic control unit (ECU), one or more circuits, and/or the like) associated with controlling angle sensor 105 and/or monitoring functional safety of angle sensor 105. In some implementations, controller 135 may be connected to angle sensor 105 such that controller 135 may receive information (e.g., one or more signals) from angle sensor 105 via one or more transmission interfaces and/or via one or more output terminals.

In some implementations, controller 135 may be capable of calibrating, controlling, adjusting, and/or the like, the one or more electrical systems and/or electrical subsystems based on the information provided by angle sensor 105. In some implementations, controller 135 may include an electronic/engine control module (ECM), a powertrain control module (PCM), a transmission control module (TCM), a brake control module (BCM or EBCM), a central control module (CCM), a central timing module (CTM), a general electronic module (GEM), a body control module (BCM), a suspension control module (SCM), and/or another type of control module associated with a vehicle.

The number and arrangement of elements and devices shown in FIG. 4 are provided as examples. In practice, there may be additional elements and/or devices, fewer elements and/or devices, different elements and/or devices, or differently arranged elements and/or devices than those shown in FIG. 4. Furthermore, two or more elements and/or devices shown in FIG. 4 may be implemented within a single element or device, or a single element and/or a single device shown in FIG. 4 may be implemented as multiple, distributed elements and/or devices. Additionally, or alternatively, a set of elements (e.g., one or more elements) and/or a set of devices (e.g., one or more devices) shown in FIG. 4 may perform one or more functions described as being performed by another set of elements and/or devices.

Figure 5:
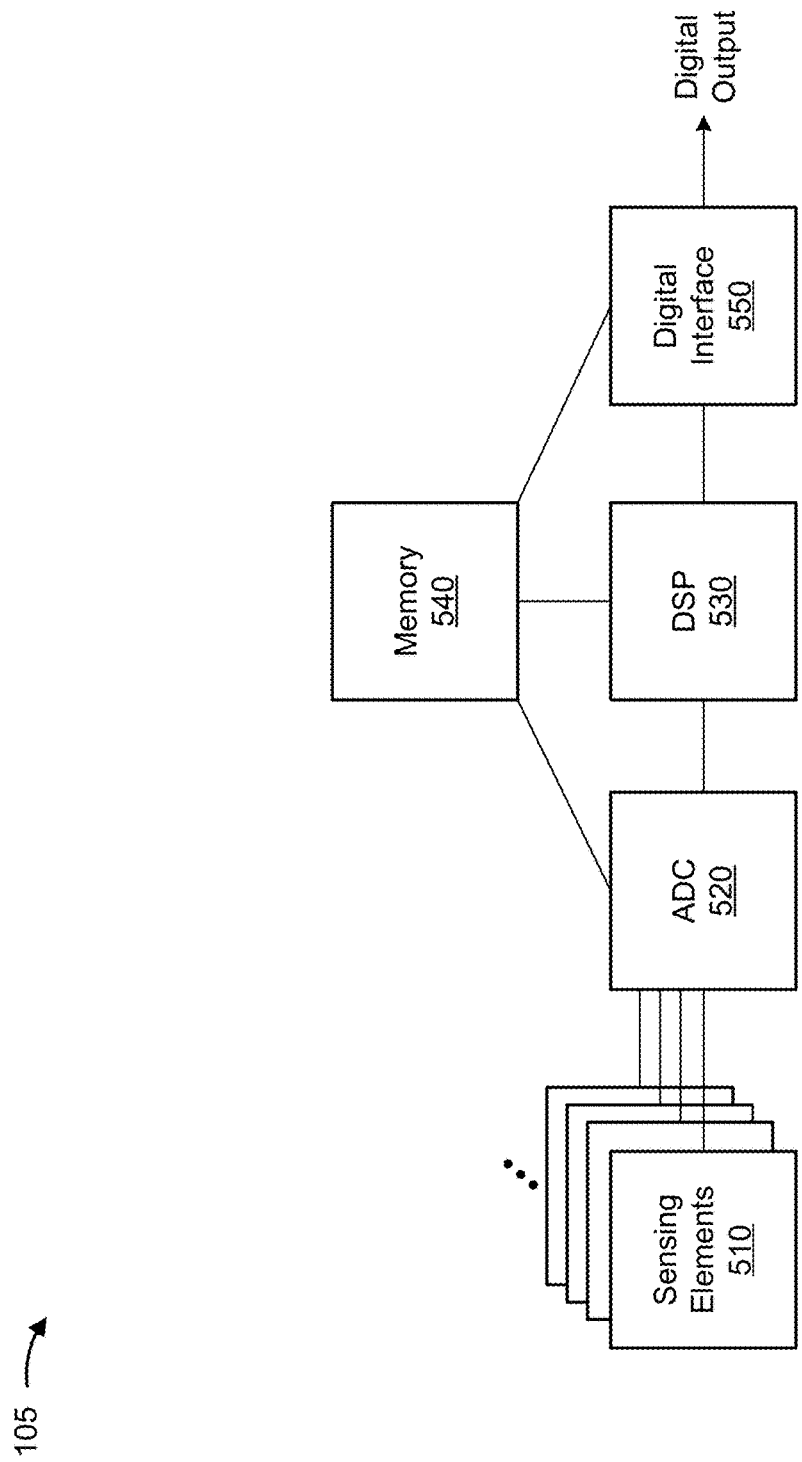
FIG. 5 is a diagram illustrating example hardware elements of a three-phase off-axis angle sensor described herein.

FIG. 5 is a diagram illustrating example hardware elements of angle sensor 105. As shown, angle sensor 105 may include sensing elements 510 (e.g., comprising at least three sets of elements), an analog-to-digital convertor (ADC) 520, a digital signal processor (DSP) 530, a memory element 540, and/or a digital interface 550.

Sensing element 510 includes an element for sensing a magnetic field present at sensing element 510. For example, sensing element 510 may include one or more Hall-based sensing elements that operate based on a Hall effect. As another example, sensing element 510 may include one or more magnetoresistive (MR) based sensing elements, where the electrical resistance of the magnetoresistive material may depend on a strength and/or a direction of the magnetic field present at the magnetoresistive material. Here, sensing element 510 may operate based on an anisotropic magnetoresistance (AMR) effect, a giant magnetoresistance (GMR) effect, a tunnel magnetoresistance (TMR) effect, and/or the like. As an additional example, sensing element 510 may include one or more variable reluctance (VR) based sensing elements that operate based on induction.

In some implementations, sensing elements 510 may be sensitive in a direction that is substantially perpendicular to a plane defined by sensing element 510 and/or a surface (e.g., a top surface, a bottom surface) of angle sensor 105. Such a direction is referred to herein as a z-direction.

In some implementations, a set of sensing elements 110 comprises one or more sensing elements 510. In some implementations, as described above, the sets of sensing elements 110 are positioned in off-axis positions (e.g., at respective radial distances d from axis 115) at different angular positions relative to axis 115. In some implementations, sensing elements 510 are sensitive in a z-direction. Therefore, as target magnet 120 rotates about axis 115 and produces a rotating magnetic field B, sensing elements 510 sense respective strengths of the $B_z$ component of the magnetic field B.

ADC 520 includes one or more analog-to-digital converters that convert analog signals from sensing elements 510 to digital signals. For example, ADC 520 may convert an analog signal received from a set of sensing elements 510 to a digital signal to be processed by DSP 530. In some implementations, ADC 520 may provide a digital signal to DSP 530. In some implementations, angle sensor 105 may include one or more ADCs 520.

DSP 530 may include a digital signal processing device or a collection of digital signal processing devices. In some implementations, DSP 530 may receive digital signals from ADC 520 and may process the digital signals in association with selective performance of one or more functional safety checks, as described herein. In some implementations, DSP 530 may process the digital signals in order to form output signals, such as output signals associated with an angular position of target magnet 120.

Memory element 540 includes a read only memory (ROM) (e.g., an EEPROM), a random access memory (RAM), and/or another type of dynamic or static storage device (e.g., a flash memory, a magnetic memory, an optical memory, etc.) that stores information and/or instructions for use by angle sensor 105, as described herein. In some implementations, memory element 540 may store information associated with processing performed by DSP 530. Additionally, or alternatively, memory element 540 may store configurational values or parameters for sensing element 510 and/or information for one or more other elements of angle sensor 105, such as ADC 520 or digital interface 550.

Digital interface 550 may include an interface via which angle sensor 105 may receive and/or provide information from and/or to another device, such as controller 135. For example, digital interface 550 may provide the output signal determined by DSP 530 to controller 135, and may receive information from controller 135.

The number and arrangement of elements shown in FIG. 5 are provided as an example. In practice, there may be additional elements, fewer elements, different elements, or differently arranged elements than those shown in FIG. 5. For example, angle sensor 105 may include one or more elements not shown in FIG. 5, such as a clock, an analog regulator, a digital regulator, a protection element, a temperature sensor, a stress sensor, and/or the like. Furthermore, two or more elements shown in FIG. 5 may be implemented within a single element, or a single element shown in FIG. 5 may be implemented as multiple, distributed elements. Additionally, or alternatively, a set of elements (e.g., one or more elements) shown in FIG. 5 may perform one or more functions described as being performed by another set of elements.

FIG. 6 is a flow chart of an example process 600 for selectively performing each of one or more functional safety checks based at least in part on a first delta signal, a second delta signal, and a third delta signal associated with an angle sensor (e.g., angle sensor 105). In some implementations, one or more process blocks of FIG. 6 may be performed by one or more elements of the angle sensor (e.g., sensing elements 510, ADC 520, DSP 530, and/or the like). Additionally, or alternatively, one or more process blocks of FIG. 6 may be performed by another device, such as a controller (e.g., controller 135).

As shown in FIG. 6, process 600 may include receiving a set of output signals including a first output signal, a second output signal, and a third output signal (block 610). For example, the angle sensor may (e.g., using DSP 530) receive a set of output signals including a first output signal, a second output signal, and a third output signal, as described above. As further shown in FIG. 6, process 600 may include determining, based on the set of output signals, a set of delta signals including a first delta signal, a second delta signal, and a third delta signal (block 620). For example, the angle sensor may (e.g., using DSP 530) determine, based on the set of output signals, a set of delta signals including a first delta signal, a second delta signal, and a third delta signal, as described above.

As further shown in FIG. 6, process 600 may include identifying one or more functional safety checks, from a plurality of functional safety checks configured on the angle sensor, for selective performance in association with determining functional safety of the angle sensor (block 630). For example, the angle sensor (e.g., using DSP 530) may identify one or more functional safety checks, from a plurality of functional safety checks configured on the angle sensor, for selective performance in association with determining functional safety of the angle sensor, as described above.

In some implementations, the one or more functional safety checks include a reference signal comparison check, a reference coefficient comparison check, and/or a delta signal window check, as described above. In some implementations, each of the plurality of functional safety checks can be performed independently of each of the other functional safety checks of the plurality of functional safety checks, as described above.

As further shown in FIG. 6, process 600 may include selectively performing each of the one or more functional safety checks based at least in part on at least one of: the set of output signals or the set of delta signals (block 640). For example, the angle sensor may (e.g., using DSP 530) selectively perform each of the one or more functional safety checks based at least in part on the set of output signals or based at least in part on the set of delta signals, as described above. In some implementations, the angle sensor may perform one or more functional safety checks using the set of output signals before, concurrently with, or after the angle sensor determines the set of delta signals. For example, the angle sensor may perform a sum check using the set of output signals before or concurrently with determining the set of delta signals.

Process 600 may include additional implementations, such as any single implementation or any combination of implementations described below and/or in connection with one or more other processes described elsewhere herein.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7F are diagrams associated with an illustrative example of selectively performing one or more of a set of functional safety checks in accordance with implementations described herein.

Figure 7A:
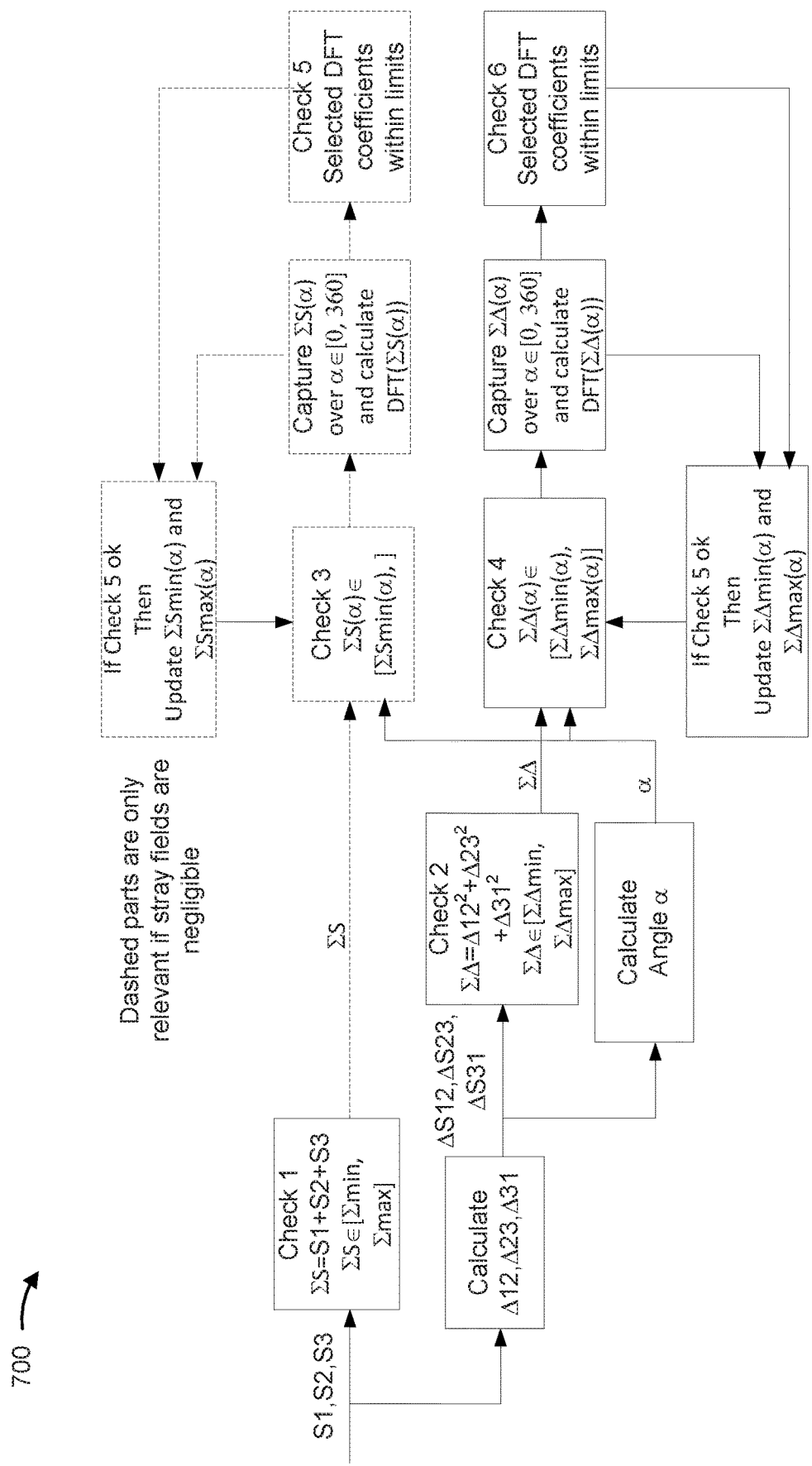
FIGS. 7A-7F are diagrams associated with illustrative examples of a number of functional safety checks described above.

FIG. 7A is a diagram of an example 700 illustrating an example of a sequence associated with performing one or more functional safety checks configured on an angle sensor (e.g., angle sensor 105). As shown in FIG. 7A, a first functional safety check (identified as check 1) may include a sum check performed using a set of output signals including signal $S_1$, signal $S_2$, and signal $S_3$. As described above, the sum check may including summing the set of output signals and determining whether a result of summing the output signals is between an upper limit and a lower limit.

Figure 7B:
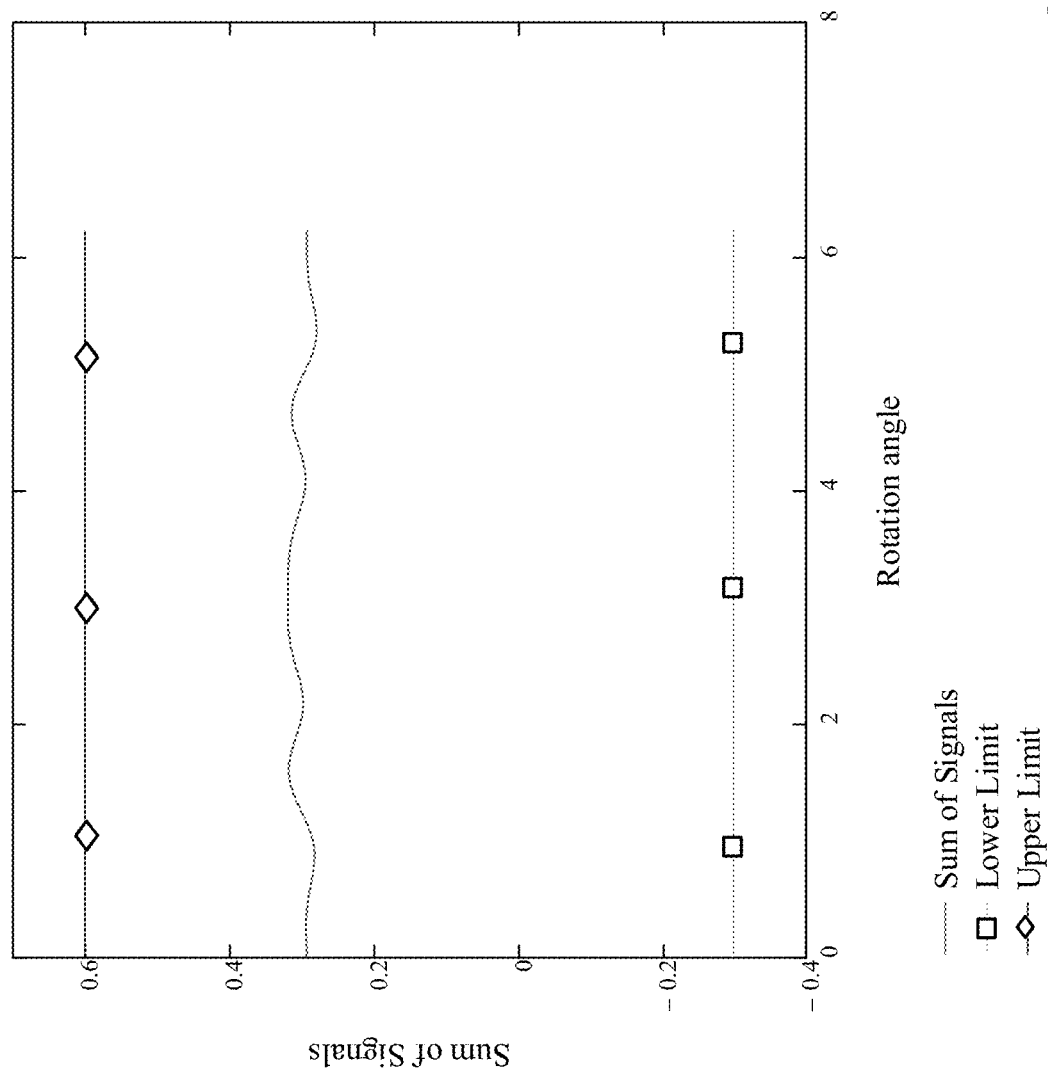

FIG. 7B is a diagram of an example result of the sum check as performed over a full rotation of a target magnet (e.g., target magnet 120). In the example shown in FIG. 7B, the angle sensor may determine whether a result of summing the set of output signals is between approximately −0.3 and approximately 0.6. Notably, the upper and lower limits associated with the sum check may be relatively wide since the tolerance of the sum check has to take into account a number of factors, such as inaccuracies resulting from mismatch of the sets of sensing elements of the angle sensor, inaccuracy of the target magnet, inaccuracies of assembly of the angle sensor with respect to the magnetic field, temperature dependencies, dependencies on mechanical movements, a stray field which is not predictable, and/or the like. In the example shown in FIG. 7B, the angle sensor may determine that the angle sensor has passed the sum check since, at a given angle of rotation, the sum of the set of output signals is within the upper limit and the lower limit.

Returning to FIG. 7A, as further shown, the angle sensor may determine a set of delta signals including delta signal $\Delta S_{12}$, delta signal $\Delta S_{23}$, and delta signal $\Delta S_{13}$. In some implementations, the angle sensor may determine the set of delta signals before, concurrently with, or after performing the sum check.

As further shown in FIG. 7A, the angle sensor may perform a second functional safety check (identified as check 2), which may include a sum of squares check. As described above, the sum of squares check may include summing squares of the set of delta signals and determining whether a result of summing the squares of the set of delta signals is between an upper limit and a lower limit.

Figure 7C:
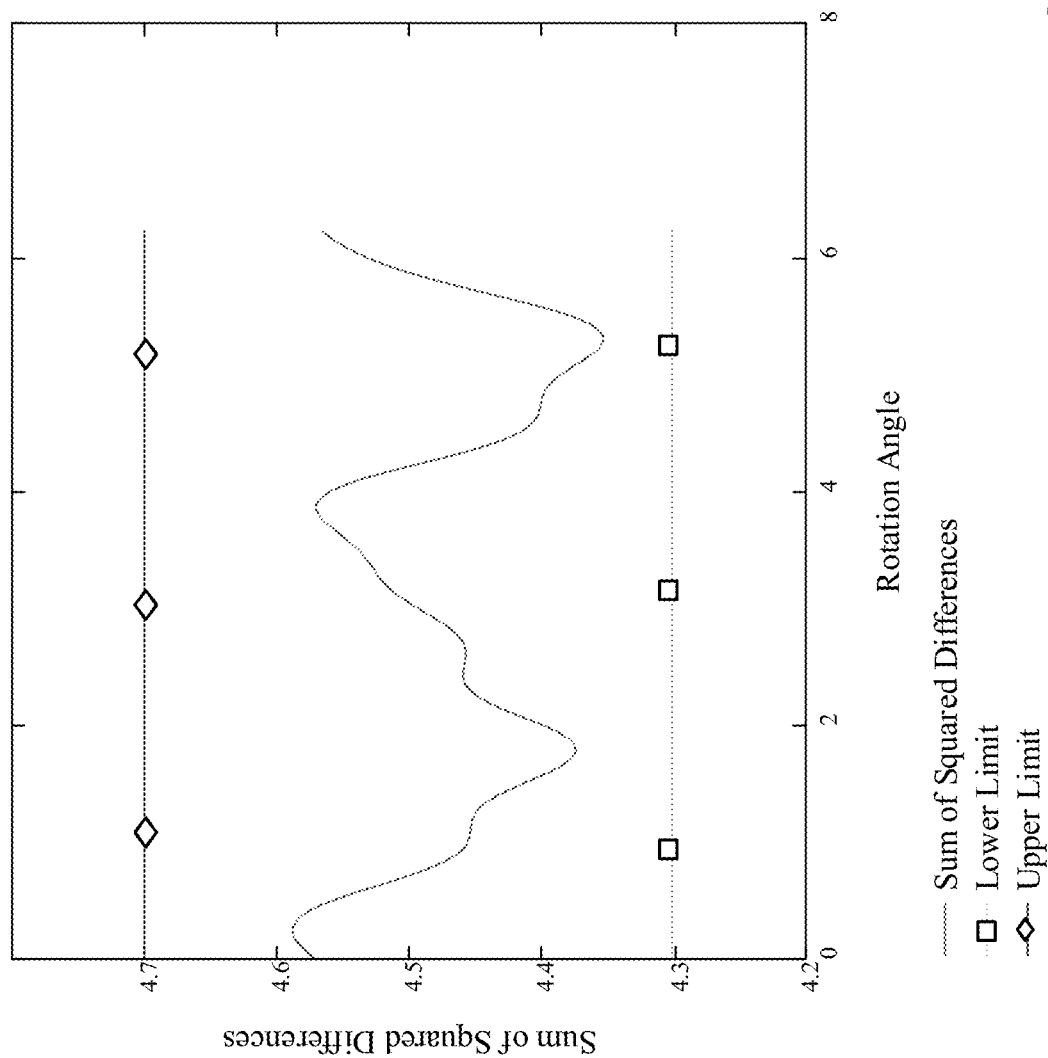

FIG. 7C is a diagram of an example result of the sum of squares check as performed over a full rotation of the target magnet. In the example shown in FIG. 7C, the angle sensor may determine whether a result of summing the squares of the delta signals is between approximately 4.3 and approximately 4.7. Notably, the difference between the upper and lower limits associated with the sum of squares can be tighter than that of the sum check since the sum of squares check does not depend on stray field and variance is only due to temperature dependencies, changes in the mechanical setup, and the gradient of the stray field. Effects to be accounted for in the tolerances associated with the sum of squares check include inaccuracies resulting from mismatch of the sets of sensing elements, inaccuracy of the target magnet, inaccuracies of the assembly of the angle sensor with respect to the magnetic field, temperature dependencies, dependencies on mechanical movements in the assembly, the gradient of the stray field, and/or the like. In the example shown in FIG. 7C, the angle sensor may determine that the angle sensor has passed the sum of squares check since, at a given angle of rotation, the sum of the squared delta signals is between the upper limit and the lower limit.

Returning to FIG. 7A, as further shown, the angle sensor may calculate an angle measurement based on the set of delta signals. In some implementations, the angle sensor may calculate the angle measurement before, concurrently with, or after performing the sum of squares check.

As further shown in FIG. 7A, the angle sensor may perform a fourth functional safety check (identified as check 4), which may include a reference signal comparison check. As described above, the reference signal comparison check may include computing a reference signal using a set of reference Fourier coefficients, and determining whether an actual signal is between an upper limit and a lower limit with respect to the reference signal.

Figure 7D:
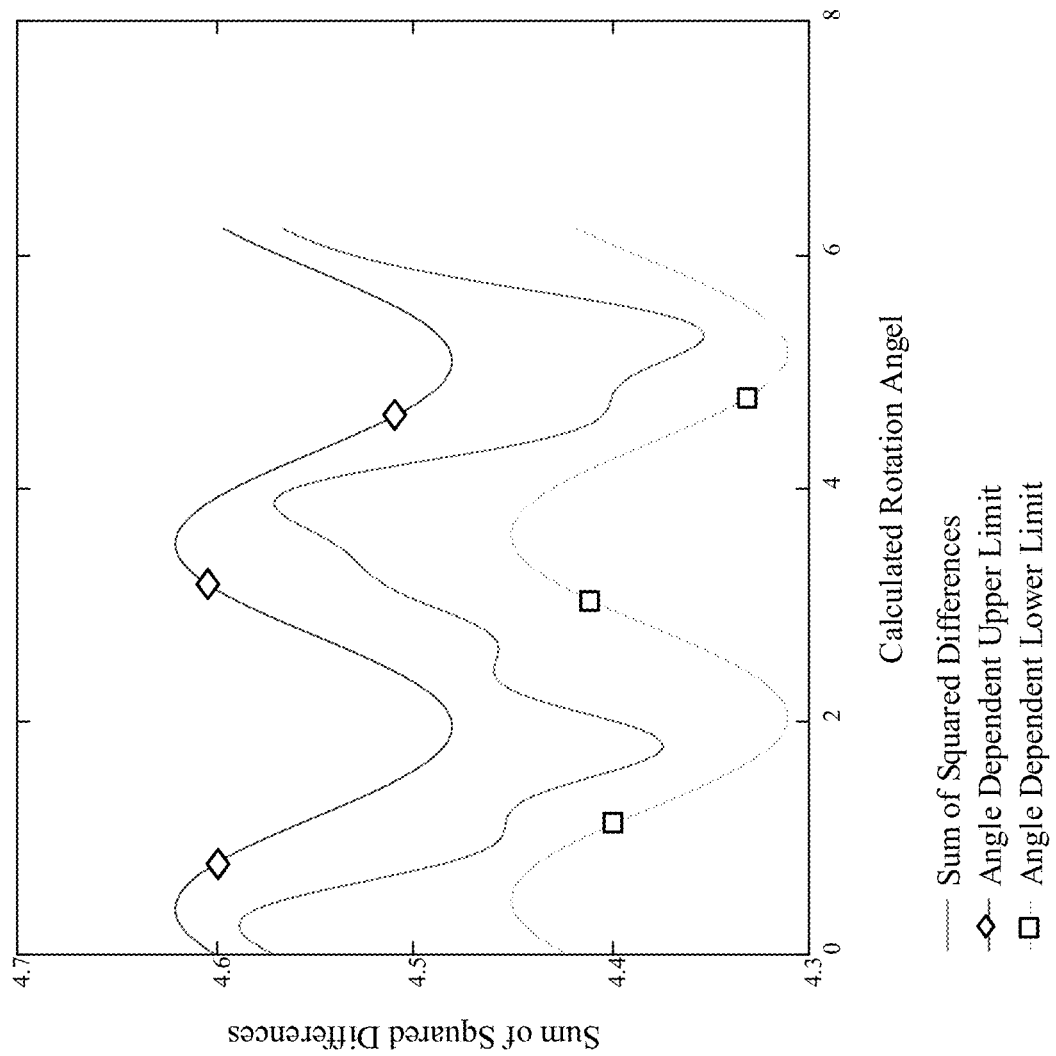

FIG. 7D is a diagram of an example result of the reference signal comparison check as performed over a full rotation of the target magnet. As illustrated in the example of FIG. 7D, the reference signal comparison check can include determining whether the sum of the squared delta signals is between an angle dependent upper and lower limits (which is calibrated after assembly of the sensor system). Here, a difference between the angle dependent upper and lower limits can be tighter than for the sum of squares check since the repeatable angle dependent errors can be taken into account for in the limit settings. The limit function in the example shown in FIG. 7D takes into account $\cos(2\alpha)$ functions with individually calibrated amplitudes, offsets and phase shifts for the upper and the lower limit. In the example shown in FIG. 7D, the angle sensor may determine that the angle sensor has passed the reference signal comparison check since, at a given angle of rotation, the sum of the squared delta signals is between the upper limit and the lower limit.

Returning to FIG. 7A, as further shown, the angle sensor may capture the sum of the squares of the delta signals over a full rotation of the target magnet, may compute a discrete Fourier transform (DFT) or a fast Fourier transform (FFT) of the sum of the squares of the delta signals over the full rotation. As further shown, the angle sensor may perform a sixth functional safety check (identified as check 6), which may include a reference coefficient comparison check. As described above, the reference coefficient comparison check may include determining whether a set of actual Fourier coefficients, computed from a test signal (e.g., a sum of the squares of the delta signals, the sum of the output signals, and/or the like), is between an upper limit and a lower limit with respect to a set of reference Fourier coefficients.

Figure 7E:
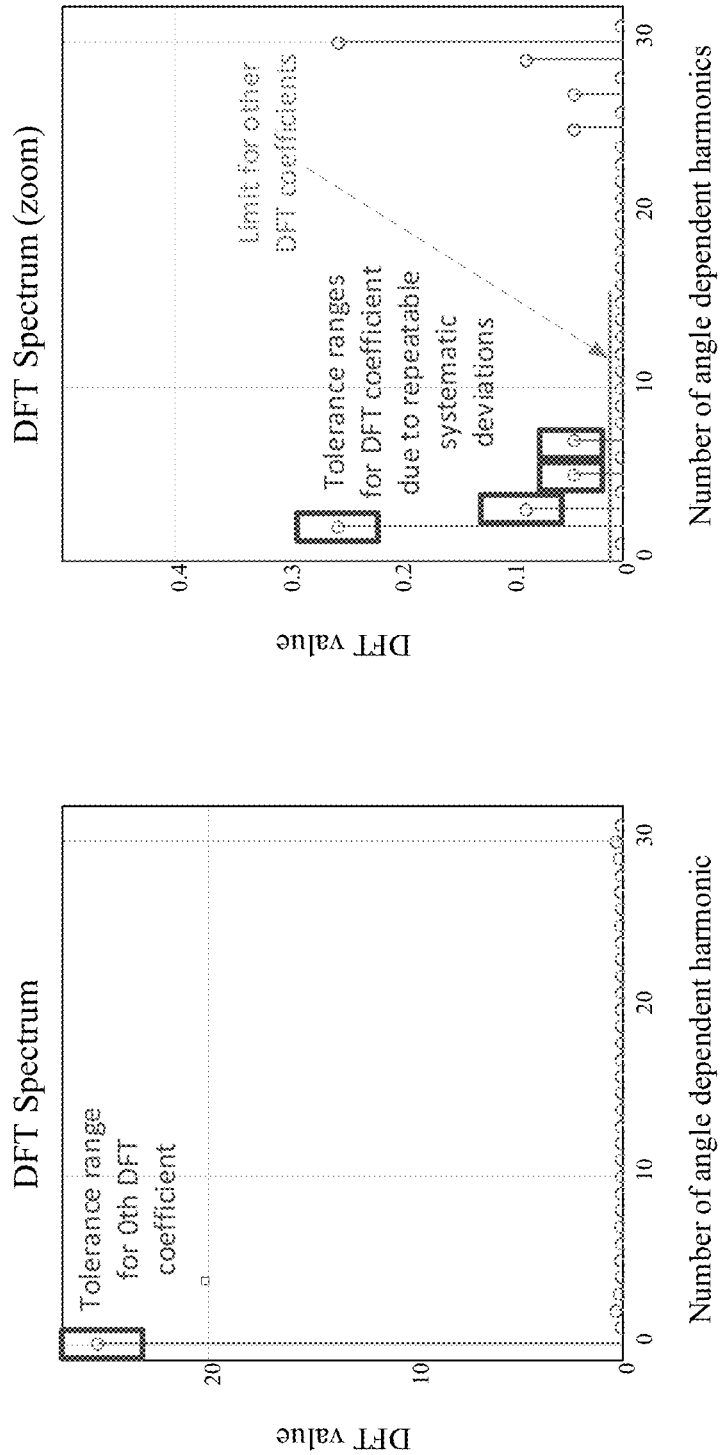

FIG. 7E is a diagram of an example result of the reference coefficient comparison check. In some implementations, the upper and lower limits can be defined independently for each point of the DFT result, as shown in FIG. 7E. As noted in FIG. 7E, some DFT points (e.g., those that include a repeatable angle dependence resulting from inaccuracies resulting from mismatch inaccuracy of the target magnet, inaccuracies of the assembly of the angle sensor with respect to the magnetic field, and/or the like) can be checked to be between within an upper and a lower limit, while other DFT points can be checked to determine whether they are sufficiently small (e.g., below a threshold). In the example shown in FIG. 7E, the angle sensor may determine that the angle sensor has passed the reference coefficient comparison check since the reference coefficients are between applicable upper and lower limits or below the applicable threshold values.

Figure 7F:
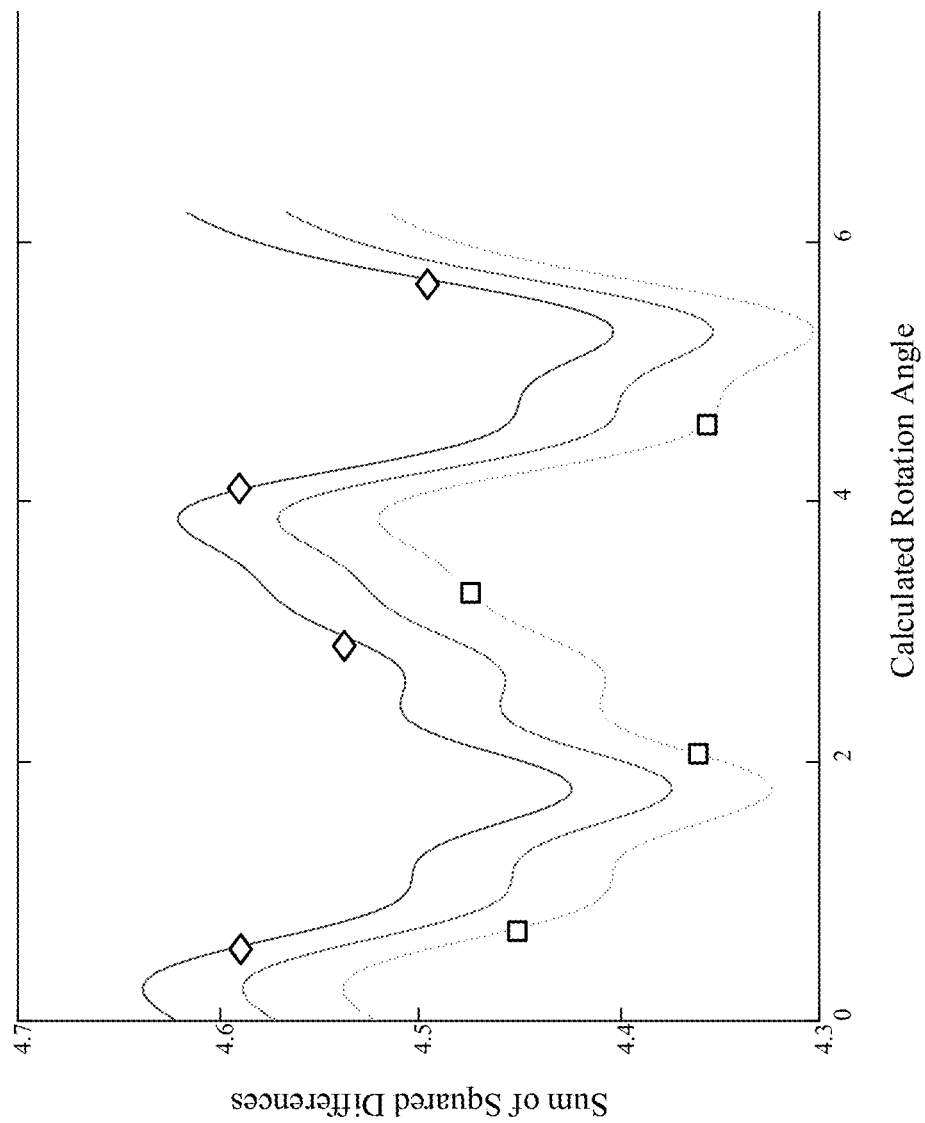

In some implementations, as described above, the angle sensor can update the set of reference Fourier coefficients used for the reference signal comparison check based on the set of actual coefficients computed as part of the reference coefficient comparison check. For example, after the sum of the squares of the delta signals passes the reference coefficient comparison check this signal can be used to update the reference coefficients associated with the reference signal comparison check. In this case, updated upper and lower limits can be defined by the data set of the signal over one rotation, where the upper and lower limits are shifted by positive or negative offsets. In some implementations, the reference could also be averaged over a certain number of repetitions of signals that passed the reference coefficient comparison check. FIG. 7F is a diagram illustrating a result of updating the upper and lower limits associated the reference signal comparison check in this manner.

In some implementations, one or more functional safety checks configured on the angle sensor may not be performed. For example, as noted in FIG. 7A, check 3 and check 5 are not performed since the introduction of angle dependent limits does not provide an advantage if the uncertainty of the limits is dominated by stray field influence. In cases where the stray field influence is negligible, checks 3 and 5 could be performed concurrently with checks 4 and 6, respectively.

FIGS. 7A-7F are provided as examples for illustrative purposes. Other examples that differ from those shown in FIGS. 7A-7F are possible.

The foregoing disclosure provides illustration and description, but is not intended to be exhaustive or to limit the implementations to the precise forms disclosed. Modifications and variations may be made in light of the above disclosure or may be acquired from practice of the implementations.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An off-axis angle sensor, comprising:
a plurality of sensing elements comprising sensing devices,
   wherein the sensing devices include at least three sensing devices that are positioned at respective radial distances from an axis of rotation of a target magnet associated with the off-axis angle sensor; and
one or more processors to:
   receive a set of output signals including a first output signal, a second output signal, and a third output signal,
      wherein the first output signal, the second output signal, and the third output signal are received as output from the plurality of sensing elements positioned at respective angular positions;
   generate, based on the set of output signals, a set of delta signals including a first delta signal, a second delta signal, and a third delta signal,
      wherein the first delta signal, the second delta signal, and the third delta signal are determined by determining a difference between the first output signal and the second output signal, the second output signal and the third output signal, and the third output signal and the first output signal, respectively, via subtraction;
   perform, based on generating the set of delta signals, calibration of the set of output signals,
      wherein the calibration includes at least one of offset compensation, amplitude compensation, or orthogonality compensation;
   identify, based on temperature information associated with the off-axis angle sensor, a set of functional safety checks, from a plurality of functional safety checks configured on the off-axis angle sensor, for selective performance in association with determining functional safety of the off-axis angle sensor,
      wherein each of the plurality of functional safety checks can be performed independently of each of other functional safety checks of the plurality of functional safety checks; and
   determine, based on a temperature sensor, temperature information near the off-axis angle sensor;
   perform one or more functional safety checks, of the set of functional safety checks, based at least in part on at least one of the set of output signals, or the set of delta signals,
      wherein the one or more functional safety checks include:
         assigning, based on the temperature information near the off-axis angle sensor, a temperature coefficient to a signal window check, and
         performing the signal window check based on assigning the temperature coefficient; and
   transmit one or more results of performing the one or more functional safety checks, and information associated with an angle of rotation of the target magnet.

2. The off-axis angle sensor of claim 1, wherein the one or more functional safety checks include a first functional safety check and a second functional safety check, and
   wherein the one or more processors, when performing the one or more functional safety checks, are to:
      perform the first functional safety check based at least in part on at least one of:
         the set of output signals, or
         the set of delta signals;
      determine, based on a result of the first functional safety check, whether the off-axis angle sensor has passed the first functional safety check; and
      selectively perform the second functional safety check based on whether the off-axis angle sensor has passed the first functional safety check.

3. The off-axis angle sensor of claim 1, wherein the one or more functional safety checks include a sum check, and wherein the one or more processors, when performing the sum check, are to:
   calculate a sum of the first output signal, the second output signal, and the third output signal; and
   determine whether the off-axis angle sensor has passed the sum check based on whether the sum of the first output signal, the second output signal, and the third output signal is between an upper limit and a lower limit.

4. The off-axis angle sensor of claim 1, wherein the one or more functional safety checks include a sum of squares check, and wherein the one or more processors, when performing the sum of squares check, are to:
   calculate a sum of a square of the first delta signal, a square of the second delta signal, and a square of the third delta signal; and
   determine whether the off-axis angle sensor has passed the sum of squares check based on whether the sum of the square of the first delta signal, the square of the second delta signal, and the square of the third delta signal is within an upper limit and a lower limit.

5. The off-axis angle sensor of claim 1, wherein the one or more functional safety checks include a reference signal comparison check, and wherein the one or more processors, when performing the reference signal comparison check, are to:
   identify a set of reference Fourier coefficients associated with the off-axis angle sensor;

compute a reference signal based on the set of reference Fourier coefficients; and determine whether the off-axis angle sensor has passed the reference signal comparison check based on whether an actual signal is between an upper limit and a lower limit with respect to the reference signal.

6. The off-axis angle sensor of claim 1, wherein the one or more functional safety checks include a reference coefficient comparison check, wherein the one or more processors, when performing the reference coefficient comparison check, are to:

sample a test signal during a full rotation of a target magnet associated with the off-axis angle sensor;

calculate a set of actual Fourier coefficients based on sampling the test signal;

determine a reference set of Fourier coefficients; and determine whether the off-axis angle sensor has passed the reference coefficient comparison check based on comparing the set of actual Fourier coefficients and the set of reference Fourier coefficients.

7. The off-axis angle sensor of claim 6, wherein the test signal corresponds to one of:

a sum of the first output signal, the second output signal, and the third output signal; or a sum of a square of the first delta signal, a square of the second delta signal, and a square of the third delta signal.

8. The off-axis angle sensor of claim 6, wherein, when the off-axis angle sensor has passed the reference coefficient comparison check, the one or more processors are further to:

update the set of reference Fourier coefficients based on the set of actual Fourier coefficients.

9. The off-axis angle sensor of claim 6, wherein, when the off-axis angle sensor has passed the reference coefficient comparison check, the one or more processors are further to:

update information associated with a reference signal, stored by the off-axis angle sensor, based on the test signal.

10. The off-axis angle sensor of claim 1, wherein the one or more functional safety checks include a signal window check, wherein the one or more processors, when performing the signal window check, are to:

determine, based on information stored in a lookup table, a first delta signal window and a second delta signal window based on the first delta signal; and determine whether the off-axis angle sensor has passed the signal window check based on whether one of:

the second delta signal is within the first delta signal window and the third delta signal is within the second delta signal window, or the second delta signal is within the second delta signal window and the third delta signal is within the first delta signal window.

11. The off-axis angle sensor of claim 1, wherein the one or more processors are further to:

determine temperature information associated with the off-axis angle sensor; and wherein the one or more processors, when performing the one or more functional safety checks, are to:

perform the one or more functional safety checks further based on the temperature information.

12. An angle sensor, comprising:

a plurality of sets of sensing elements comprising of sensing devices, wherein the sensing elements include at least three sensing devices that are positioned at respective radial distances from an axis of rotation of a target magnet;

one or more processors to:

generate a set of delta signals including a first delta signal, a second delta signal, and a third delta signal, wherein the set of delta signals is determined based on a set of output signals including a first output signal, a second output signal, and a third output signal associated with the plurality of sets of sensing elements, wherein the first output signal, the second output signal, and the third output signal are received as output from the plurality of sets of sensing elements positioned at respective angular positions, and wherein the first delta signal, the second delta signal, and the third delta signal are determined by determining a difference between the first output signal and the second output signal, the second output signal and the third output signal, and the third output signal and the first output signal, respectively, via subtraction;

perform, based on generating the set of delta signals, calibration of the set of output signals, wherein the calibration includes at least one of offset compensation, amplitude compensation, or orthogonality compensation;

determine, based on a temperature sensor, temperature information near the angle sensor;

identify, based on the temperature information near the angle sensor, a set of functional safety checks for selective performance in association with determining functional safety of the angle sensor, wherein the set of functional safety checks includes at least one of a reference signal comparison check, a reference coefficient comparison check, or a delta signal window check, wherein the set of functional safety checks further include:

assigning, based on the temperature information near the angle sensor, a temperature coefficient to a signal window check, and performing the signal window check based on assigning the temperature coefficient; and perform one or more functional safety checks, of the set of functional safety checks, based at least in part on at least one of:

the set of output signals, or the set of delta signals.

13. The angle sensor of claim 12, wherein the one or more functional safety checks includes the reference signal comparison check, and wherein the one or more processors, when performing the reference signal comparison check, are to:

identify a set of reference Fourier coefficients associated with the angle sensor;

compute a reference signal based on the set of reference Fourier coefficients; and determine whether the angle sensor has passed the reference signal comparison check based on whether an actual signal is between an upper limit and a lower limit with respect to the reference signal.

14. The angle sensor of claim 12, wherein the one or more functional safety checks include the reference coefficient comparison check, and wherein the one or more processors, when performing the reference coefficient comparison check, are to:
    sample a test signal during a full rotation of the target magnet associated with the angle sensor;
    calculate a set of actual Fourier coefficients based on sampling the test signal;
    determine a reference set of Fourier coefficients; and
    determine whether the angle sensor has passed the reference coefficient comparison check based on comparing the set of actual Fourier coefficients and the set of reference Fourier coefficients.

15. The angle sensor of claim 14, wherein, when the angle sensor has passed the reference coefficient comparison check, the one or more processors are further to:
    update the reference set of Fourier coefficients based on the set of actual Fourier coefficients, or
    update information associated with a reference signal, stored by the angle sensor, based on the test signal.

16. The angle sensor of claim 12, wherein the one or more functional safety checks include a signal window check, wherein the one or more processors, when performing the signal window check, are to:
    determine a first delta signal window and a second delta signal window based on the first delta signal; and
    determine whether the angle sensor has passed the signal window check based on whether one of:
        the second delta signal is within the first delta signal window and the third delta signal is within the second delta signal window, or
        the second delta signal is within the second delta signal window and the third delta signal is within the first delta signal window.

17. A method, comprising:
    receiving, by one or more processors of an angle sensor, a set of output signals including a first output signal, a second output signal, and a third output signal,
        wherein the first output signal, the second output signal, and the third output signal are received as output from a plurality of sensing elements of the angle sensor positioned at respective angular positions, and
        wherein the sensing elements include at least three sensing devices that are positioned at a respective radial distance from an axis of rotation of a target magnet;
    determining, by the one or more processors and based on the set of output signals, a set of delta signals including a first delta signal, a second delta signal, and a third delta signal,
        wherein the first delta signal, the second delta signal, and the third delta signal are determined by determining a difference between the first output signal and the second output signal, the second output signal and the third output signal, and the third output signal and the second output signal, respectively, via subtraction;
    performing, by the one or more processors and based on determining the set of delta signals, calibration of the set of output signals,
        wherein the calibration includes at least one of offset compensation, amplitude compensation, or orthogonality compensation;
    determining, by the one or more processors and based on a temperature sensor, temperature information near the angle sensor;
    identifying, by the one or more processors, and based on temperature information associated with the angle sensor, one or more functional safety checks, from a plurality of functional safety checks configured on the angle sensor, for selective performance in association with determining functional safety of the angle sensor,
        wherein the one or more functional safety checks include a reference signal comparison check, a reference coefficient comparison check, or a delta signal window check,
        wherein the one or more functional safety checks further include:
            assigning, based on the temperature information near the angle sensor, a temperature coefficient to a signal window check, and performing the signal window check based on assigning the temperature coefficient, and
        wherein each of the plurality of functional safety checks can be performed independent of each of other functional safety checks of the plurality of functional safety checks; and
    selectively performing, by the one or more processors, each of the one or more functional safety checks based at least in part on at least one of:
        the set of output signals, or
        the set of delta signals.

18. The method of claim 17, wherein the one or more functional safety checks include a first functional safety check and a second functional safety check, and
    wherein selectively performing the one or more functional safety checks comprises:
        performing the first functional safety check based at least in part on at least one of:
            the set of output signals, or the set of delta signals;
        determining, based on a result of the first functional safety check, whether the angle sensor has passed the first functional safety check; and
        selectively performing the second functional safety check based on whether the angle sensor has passed the first functional safety check.

19. The off-axis angle sensor of claim 1, wherein the one or more processors are further to:
    populate a lookup table that identifies signal windows for a particular value of a particular delta signal.

20. The angle sensor of claim 12, wherein the angle sensor is configured to populate a lookup table that identifies signal windows for a particular value of a particular delta signal.

* * * * *